US007170827B2

(12) United States Patent
Endo et al.

(10) Patent No.: US 7,170,827 B2
(45) Date of Patent: Jan. 30, 2007

(54) TIMEPIECE, HAVING BEARING PORTION FORMED OF RESIN AND WHEEL TRAIN

(75) Inventors: Morinobu Endo, Suzaka (JP); Tetsuo Uchiyama, Tokyo (JP); Akio Yamaguchi, Kasugai (JP); Yasuo Kondo, Toyota (JP); Hiroshi Aoyama, Nagoya (JP); Koichiro Jujo, Kisarazu (JP); Kazutoshi Takeda, Sakura (JP); Masato Takenaka, Misato (JP); Shigeo Suzuki, Ichikawa (JP); Takeshi Tokoro, Tokyo (JP)

(73) Assignees: Kitagawa Industries Co., Ltd, Aichi-ken (JP); Seiko Instruments, Inc., Chiba-ken (JP)

( * ) Notice: Subject to any disclaimer, the term of this patent is extended or adjusted under 35 U.S.C. 154(b) by 165 days.

(21) Appl. No.: 10/499,688
(22) PCT Filed: Dec. 20, 2002

(86) PCT No.: PCT/JP02/13402
§ 371 (c)(1),
(2), (4) Date: Feb. 7, 2005

(87) PCT Pub. No.: WO03/054637

PCT Pub. Date: Jul. 3, 2003

(65) Prior Publication Data

US 2005/0128884 A1 Jun. 16, 2005

(30) Foreign Application Priority Data

Dec. 21, 2001 (JP) ............................ 2001-390281

(51) Int. Cl.

| | |
|---|---|
| ***G04F 5/00*** | (2006.01) |
| ***G04B 29/00*** | (2006.01) |
| ***F03G 1/00*** | (2006.01) |
| ***B32B 9/00*** | (2006.01) |
| ***C08K 3/00*** | (2006.01) |

(52) U.S. Cl. ...................... 368/160; 368/318; 368/324; 185/37; 428/367; 428/403; 523/468; 524/424; 977/734

(58) Field of Classification Search .................. 368/88, 368/160, 280, 318, 322–323; 185/37
See application file for complete search history.

(56) References Cited

U.S. PATENT DOCUMENTS 4,711,584 A * 12/1987 Tanazawa et al. ............ 368/88

(Continued)

FOREIGN PATENT DOCUMENTS

EP 0206600 12/1986

(Continued)

OTHER PUBLICATIONS

Translation of the International Preliminary Examination Report with Written Opinion mailed Dec. 20, 2002 (7 pages).

*Primary Examiner*—Vit W. Miska
(74) *Attorney, Agent, or Firm*—Grossman, Tucker, Perreault & Pfleger, PLLC

(57) ABSTRACT

The invention relates to a timepiece which has a resin bearing section. Moreover, the invention relates to a wheel train apparatus which has a resin bearing section. The invention is constituted by the timepiece provided with a gear wheel and supporting members which support the gear wheel, the supporting members being formed from a filler containing resin. Alternatively the invention is constituted by the wheel train apparatus provided with a gear wheel and supporting members which support the gear wheel, the supporting members being formed from a filler containing resin.

12 Claims, 11 Drawing Sheets

U.S. PATENT DOCUMENTS

| | | | | |
|---|---|---|---|---|
| 4,777,204 | A | 10/1988 | Ikenaga et al. | |
| 4,858,210 | A * | 8/1989 | Yamada et al. | 368/238 |
| 5,545,686 | A * | 8/1996 | Carter et al. | 524/513 |
| 6,426,134 | B1 * | 7/2002 | Lavin et al. | 428/300.1 |
| 2001/0030908 | A1 * | 10/2001 | Moteki et al. | 368/140 |
| 2003/0231557 | A1 * | 12/2003 | Nakajima et al. | 368/281 |

FOREIGN PATENT DOCUMENTS

| | | |
|---|---|---|
| JP | S50-99365 | 8/1975 |
| JP | S53-63068 | 6/1978 |
| JP | S53-138870 | 11/1978 |
| JP | S55-127219 | 9/1980 |
| JP | S58-56989 | 4/1983 |
| JP | 58084258 | 5/1983 |
| JP | 61285249 | 12/1986 |
| JP | S62-162687 | 10/1987 |
| JP | 3064367 | 3/1991 |
| JP | 03-081370 | 5/1991 |
| JP | 7229975 | 8/1995 |
| JP | 11094956 | 4/1999 |

* cited by examiner

TIMEPIECE, HAVING BEARING PORTION FORMED OF RESIN AND WHEEL TRAIN

TECHNICAL FIELD

The present invention relates to a timepiece which has a resin bearing, for example, an analog electronic timepiece and a mechanical timepiece. Moreover, the present invention relates to a wheel train apparatus which has a resin bearing, applicable to measuring instruments, printers, imaging equipment, recording equipment, and the like.

BACKGROUND ART

Conventionally, in a timepiece including a wheel train which rotates by driving a motor, for example, in an analog electronic timepiece, a wheel train is rotated by driving a rotor constituting a step motor. Rotor includes rotor magnet and rotor pinion (in a rotor this refers to parts other than the rotor magnet, and similarly hereunder). For example, gear wheels such as a rotor pinion, a fifth wheel-and-pinion, a fourth wheel-and-pinion, a third wheel-and-pinion, and a center wheel-and-pinion, constitute the wheel train. Moreover, conventionally, in a timepiece including a wheel train which rotates by the force of a mainspring, for example, in a mechanical timepiece, the wheel train is rotated by rotation of a barrel drum including mainsprings. For example, gear wheels such as a barrel complete, a second wheel-and-pinion, a third wheel-and-pinion, a fourth wheel-and-pinion, and an escape wheel-and-pinion constitute a wheel train. A gear wheel has a gear wheel section and a shaft section. Supporting members such as a main plate, a wheel train bridge, and a second bridge are provided with bearing section. The shaft section of the gear wheel is rotatably supported by the bearing section.

The main plate, the wheel train bridge, and the second bridge constitute supporting members. The main plate, the wheel train bridge, and the second bridge are formed from a metal such as brass. The construction of the bearing section of the wheel train is such that a ruby hole jewel and a copper alloy bush are formed separately from a main body of the main plate (main plate body), a main body of the wheel train bridge (wheel train bridge body), and a main body of the second bridge (second bridge body) so that the jewel and the pivot frame are inserted into the main plate body, the wheel train bridge body, and the second bridge body with pressure to secure. Or, a bearing hole (pivot hole) constructing the bearing section is formed directly on the main plate body, the wheel train bridge body, and the second bridge body. In either construction, the bearing section of the wheel train is lubricated with lubricating oil (oil for timepiece).

However, due to vibration when using a timepiece or impact on the timepiece, there is the likelihood such that the lubricating oil is dispersed, with the unnecessary lubricating oil being adhered to tooth surfaces of the gear or a hair spring, causing deterioration of the timepiece. Moreover, due to the temperature variation in the environment for using the timepiece, there is the likelihood such that the viscosity of the lubricating oil varies, greatly affecting the basic functions of the timepiece, such as increasing the power consumption, decreasing the oscillation angle of the balance complete, or the like. Moreover, in order to prevent the lubricating oil from being evaporated or dispersed, if a special bearing structure such as "combined jewelled bush" including the cap jewel and the jewel is used, or the bearing section is provided with an "oil collection section", the bearing structure becomes complex, causing the problem of high cost of the timepiece.

Furthermore, in the case where a ruby jewel is used, there is a problem in that, for example, similarly to a jewel constituting the bearing sections above and below the barrel drum wheel, as the ratio (outer diameter/hole diameter) of the jewel comes closer to 1.0, the likelihood of breaking the jewel is increased. For example, referring to FIG. 11, in a conventional automatic winding timepiece, a oscillating weight shaft 812 is driven into a transfer bridge 810. An inner ring 822 is screwed into a male screw section of the oscillating weight shaft 812. The inner ring 822 and a ball stopper ring 820 rotatably support an outer ring 826 through a plurality of balls 824. A weight (not shown) is fixed onto the outer ring 826 through a rotation plumb body 828. A retainer 830 locates the plurality of balls 824 in the position between the inner ring 822, the ball stopper ring 820, and the outer ring 826. A upper hole jewel bush for fourth wheel-and-pinion 814 is driven into the central hole of the oscillating weight shaft 812. A fourth upper jewel 816 is driven into the central hole of the upper hole jewel bush for fourth wheel-and-pinion 814. The upper hole jewel bush for fourth wheel-and-pinion 814 rotatably supports an upper-shaft section 840*b* of a fourth wheel-and-pinion 840. As shown in FIG. 11, in such doubly driven configuration where the jewel frame is driven into the supporting members and the jewel is driven into the jewel frame which is driven into the supporting members, there is a high likelihood of breaking the jewel when the jewel is being driven in to the jewel frame. The likelihood of breaking the jewel occurs remarkably particularly when the part where the jewel frame is being driven and the part where the jewel is being driven into the jewel frame are approximately on the same plane.

DISCLOSURE OF INVENTION

In the present invention, a timepiece having a driving source and a wheel train includes: a motor and/or a mainspring constituting the driving source; a gear wheel configured so as to rotate by rotation of the motor; and/or a gear wheel configured so as to rotate using the mainspring as the driving source. The gear wheel has a gear wheel section and a shaft section. The timepiece of the present invention includes supporting members including a bearing section which rotatably supports the shaft section of the gear wheel, the supporting members being formed from a filler containing resin having a base resin of thermoplastic resin and carbon filler mixed with this base resin. As a result, the timepiece of the present invention is constructed such that the bearing section of the supporting members does not require lubricating oil. The timepiece of the present invention may be also constructed such that the supporting members include a main body of the supporting members and a bearing member constructed separately from the main body, and the bearing section is provided on the bearing member.

Moreover, in the present invention, a timepiece having a driving source and a wheel train includes: a motor and/or a mainspring constituting the driving source; a gear wheel configured so as to rotate by rotation of the motor, and/or a gear wheel configured so as to rotate using the mainspring as the driving source. The gear wheel has a gear wheel section and a shaft section. The timepiece of the present invention includes supporting members including a bearing section which rotatably supports the shaft section of the gear wheel, the supporting members being formed from a filler containing resin having a base resin of thermoplastic resin and carbon filler mixed with this base resin. At least the shaft section of the gear wheel is formed from a filler containing resin having a base resin of thermoplastic resin and carbon filler mixed with this base resin. As a result, the timepiece of the present invention is constructed such that the bearing section of the supporting members does not require lubricating oil.

Moreover, in the present invention, a timepiece having a driving source and a wheel train includes: a motor and/or a mainspring constituting the driving source; a gear wheel configured so as to rotate by rotation of the motor, and/or a gear wheel configured so as to rotate using the mainspring as the driving source. The gear wheel has a gear wheel section and a shaft section. The timepiece of the present invention includes supporting members including a bearing section which rotatably supports the shaft section of the gear wheel, the gear wheel being formed from a filler containing resin having a base resin of thermoplastic resin and carbon filler mixed with this base resin. As a result, the construction is such that the bearing section of the supporting members does not require lubricating oil.

Moreover, in the present invention, the wheel train apparatus including a gear wheel and supporting members includes; a gear wheel having a gear wheel section and a shaft section, and supporting members including a bearing section which rotatably supports the shaft section of the gear wheel. The supporting members are formed from a filler containing resin having a base resin of thermoplastic resin and carbon filler mixed with this base resin. As a result, the wheel train apparatus of the present invention is constructed such that the bearing section of the supporting members does not require lubricating oil. The supporting members of the wheel train apparatus of the present invention may include a main body of the supporting members and a bearing member separately constructed from the main body, and the bearing section may be provided on the bearing member.

Furthermore, in the present invention, the wheel train apparatus including a gear wheel and supporting members includes; a gear wheel having a gear wheel section and a shaft section, and supporting members including a bearing which rotatably supports the shaft section of the gear wheel. The supporting members are formed from a filler containing resin having a base resin of thermoplastic resin and carbon filler mixed with this base resin. At least the shaft section of the gear wheel is formed from a filler containing resin having a base resin of thermoplastic resin and carbon filler mixed with this base resin. As a result, the wheel train apparatus of the present invention is constructed such that the bearing section of the supporting members does not require lubricating oil.

Furthermore, in the present invention, the wheel train apparatus including a gear wheel and supporting members includes; a gear wheel having a gear wheel section and a shaft section, and supporting members including a bearing section which rotatably supports the shaft section of the gear wheel. Here, the gear wheel is formed from a filler containing resin having a base resin of thermoplastic resin and carbon filler mixed with this base resin. As a result, the wheel train apparatus of the present invention is constructed such that the bearing section of the supporting members does not require lubricating oil.

In the present invention, preferably the base resin is selected from a group consisting of; polystyrene, polyethylene terephthalate, polycarbonate, polyacetal (polyoxymethylene), polyamide, modified polyphenylene ether, polybutylene terephthalate, polyphenylene sulfide, polyether ether ketone, and polyether imide. Furthermore, in the present invention, preferably the carbon filler is selected from a group consisting of; a monolayer carbon nanotube, a multilayer carbon nanotube, a vapor grown carbon fiber, a nanografiber, a carbon nanohorn, a cup stack type carbon nanotube, a monolayer fullerene, a multilayer fullerene, and a mixture of any one of the carbon fillers doped with boron.

In the present invention, since the components constituting the bearing section are formed from a filler containing resin, it becomes possible to manufacture timepieces and wheel train apparatus having a simple construction without using the ruby jewel, the ruby jewel frame, or the copper alloy pivot frame. Moreover, in the timepiece and the wheel train apparatus of the present invention, since the shaft section and the bearing section are formed from a filler containing resin having a base resin filled with a carbon filler, it is not necessary to lubricate the bearing section of the supporting members with lubricating oil, and due to the sliding performance of the carbon filler, the shaft section and the bearing section are unlikely to wear out. Regarding the bearing section of the wheel train apparatus of the present invention, there is extremely little likelihood of breaking of the components constituting the bearing section when manufacturing. Furthermore, in the timepiece having the wheel train and the wheel train apparatus of the present invention, since the components constituting the shaft section and the bearing section are formed from a general purpose resin as the base resin, the cost becomes low and the resin can be recycled better.

Figure 1:
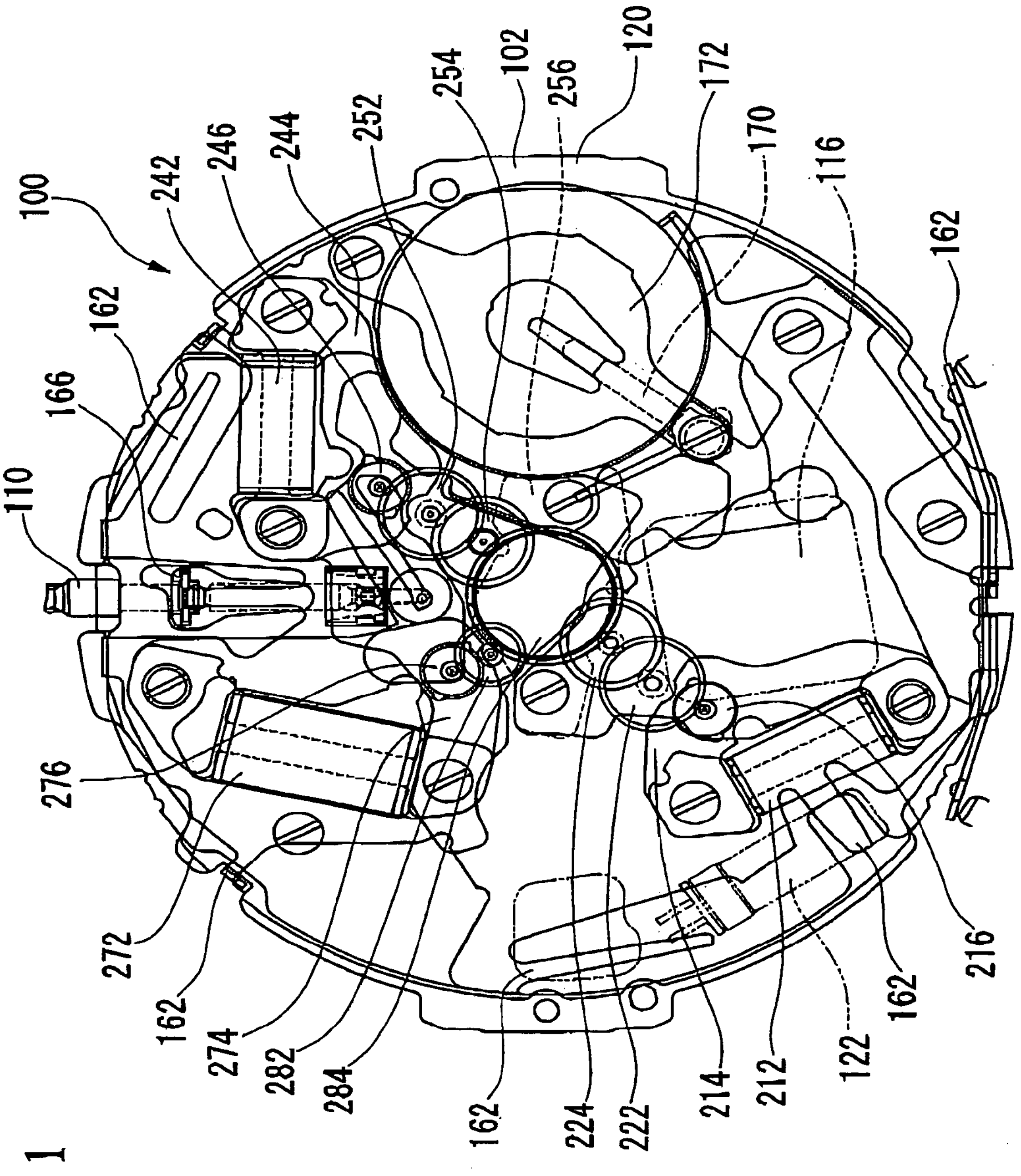
FIG. 1 is a plan view showing a schematic configuration of a movement seen from the obverse side, in a first embodiment of the present invention (some components are omitted in FIG. 1).

BEST MODE FOR CARRYING OUT THE INVENTION (First Embodiment)

First is the description of a first embodiment of the present invention. The first embodiment of the present invention is a timepiece having a wheel train, that is, an analog electronic timepiece. However, the present invention is not limited to the analog electronic timepiece and is applicable to measuring instruments, printers, imaging equipment, recording equipment, and the like.

Referring to FIG. 1 to FIG. 4, in the first embodiment of the analog electronic timepiece of the present invention, a movement (machine body) 100 of the analog electronic timepiece has a main plate 102 constituting a substrate of the movement. A hand setting stem 110 is rotatably built in to a hand setting stem guiding hole of the main plate 102. A dial 104 (denoted by imaginary lines in FIG. 2) is attached to the movement 100. The movement 100 is provided with a changeover spring 166 which determines the position in the axial direction of the hand setting stem 110. On the “obverse side” of the movement 100, a battery 120, a circuit block 116, an hour motor 210, an hour display wheel train 220, a minute motor 240, a minute display wheel train 250, a second motor 270, a second display wheel train 280, and the like are arranged. The main plate 102, a wheel train bridge 112, and a second bridge 114 constitute support members. The configuration is such that rotation of the hour motor 210 causes rotation of the hour display wheel train 220 so that the hour hand 230 can display the “hour” of the present time. Moreover, the configuration is such that rotation of the minute motor 240 causes rotation of the minute display wheel train 250 so that the minute hand 260 can display the “minute” of the present time. Furthermore, the configuration is such that rotation of the second motor 270 causes rotation of the second display wheel train 280 so that the second hand 290 can display the “second” of the present time.

An IC 118 and a quartz resonator 122 are installed in the circuit block 116. The circuit block 116 is fixed with respect to the main plate 102 and the wheel train bridge 112 by a switch spring 162 through an insulating plate 160. The changeover spring 166 is integrally formed with the switch spring 162. The battery 120 constitutes the power source of the analog electronic timepiece. A rechargeable secondary cell or a rechargeable capacitor may be also used for the power source of the analog electronic timepiece. The quartz resonator 122 constitutes the oscillation source of the analog electronic timepiece. It oscillates for example at 32,768 Hz.

Figure 2:
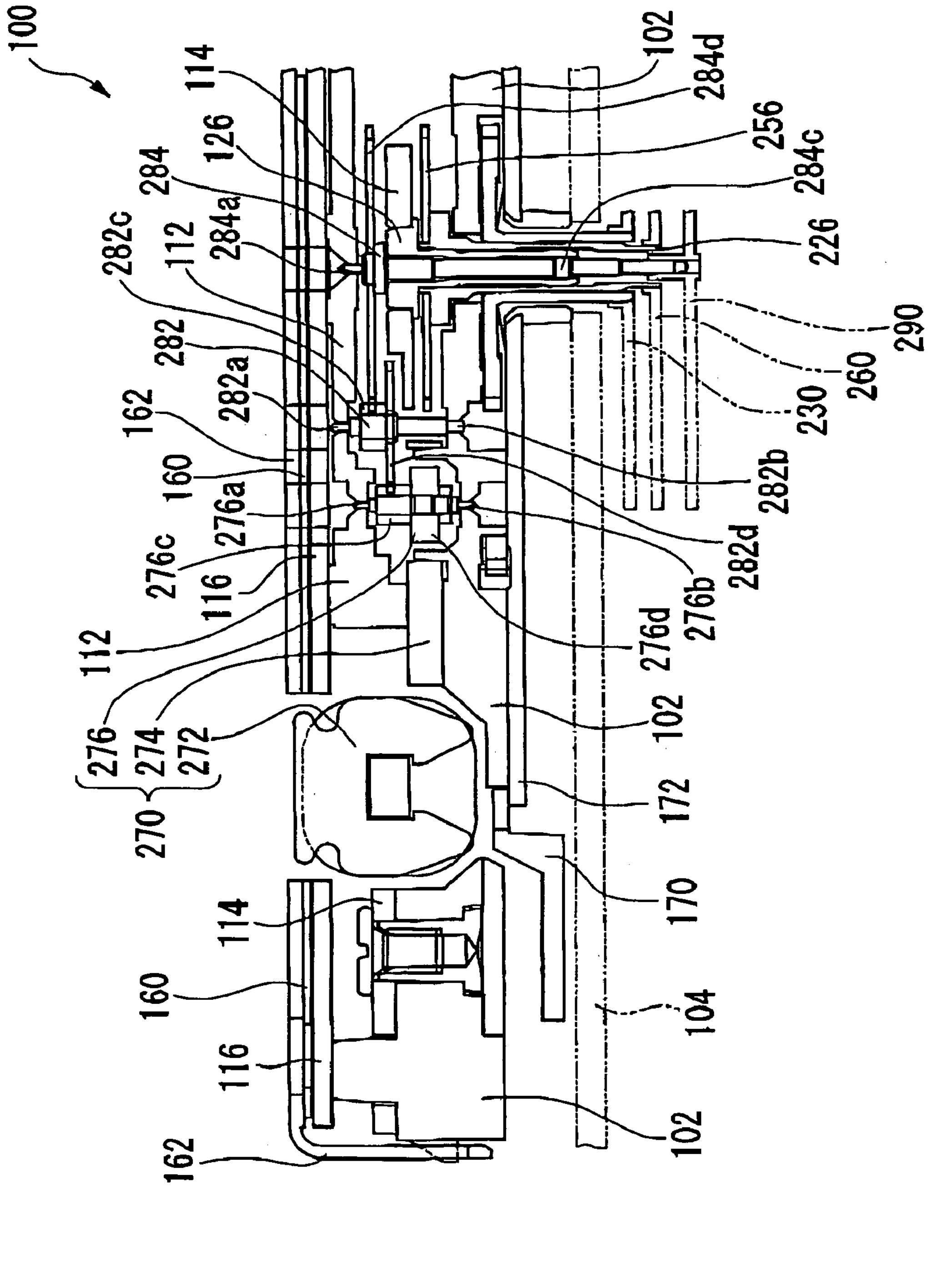
FIG. 2 is a schematic fragmentary sectional view showing a part from a second motor to a second hand, in the first embodiment of the present invention.

Referring to FIG. 1 and FIG. 2, a second motor 270 includes a second coil block 272, a second stator 274, and a second rotor 276. When the second coil block 272 inputs a second motor drive signal, the second stator 274 is magnetized to rotate the second rotor 276. The second rotor 276 is configured for example so that it rotates 180 degrees per second. The second rotor 276 includes an upper-shaft section 276*a*, a lower-shaft section 276*b*, a pinion section 276*c*, and a rotor magnet 276*d*. The upper-shaft section 276*a*, the lower-shaft section 276*b*, and the pinion section 276*c* are formed from a metal such as carbon steel. The configuration is such that, based on rotation of the second rotor 276, a second wheel 284 rotates through rotation of a second transfer wheel 282. The second transfer wheel 282 includes an upper-shaft section 282*a*, a lower-shaft section 282*b*, a pinion section 282*c*, and a gear wheel section 282*d*. The pinion section 276*c* is configured so that it meshes with the gear wheel section 282*d*. The upper-shaft section 282*a*, the lower-shaft section 282*b*, and the pinion section 282*c* are formed from a metal such as carbon steel. The gear wheel section 282*d* is formed from a metal such as brass.

The second wheel 284 is configured for example so that it rotates once per minute. The second wheel 284 includes an upper-shaft section 284*a*, a bead section 284*b*, and a gear wheel section 284*d*. The pinion section 282*c* is configured so that it meshes with the gear wheel section 284*d*. The upper-shaft section 284*a* and the bead section 284*b* are formed from a metal such as carbon steel. The gear wheel section 284*d* is formed from a metal such as brass. The second hand 290 is attached to the second wheel 284. The second wheel 284 may be arranged at the center of the analog electronic timepiece, or may be arranged in a different location from the center of the analog electronic timepiece. The second hand 290 constitutes a second display member. Any one of a second hand, a disk, and other display members in floral or geometric patterns may be used for the second display member. The second display wheel train 220 includes the second transfer wheel 282 and the second wheel 284. The second rotor 276 and the second transfer wheel 282 are rotatably supported with respect to the main plate 102 and the wheel train bridge 112. The second wheel 284 is rotatably supported with respect a center pipe 126 provided on the second bridge 114 and the wheel train bridge 112. That is, the upper-shaft section 276*a* of the second rotor 276, the upper-shaft section 282*a* of the second transfer wheel 282, and the upper-shaft section 284*a* of the second wheel 284 are rotatably supported with respect to the wheel train bridge 112. Moreover, the lower-shaft section 276*b* of the second rotor 276 and the lower-shaft section 282*b* of the second transfer wheel 282 are rotatably supported with respect to the main plate 102. A date dial 170 is rotatably supported with respect to the main plate 102.

The main plate 102 and the wheel train bridge 112 are formed from a filler containing resin having a base resin of thermoplastic resin and carbon filler mixed with this base resin. If the main plate 102 and the wheel train bridge 112 are formed from the filler containing resin, the durability performance for the shaft section and bearing section becomes better, and the maintenance becomes easier.

The base resin used in the present invention is generally polystyrene, polyethylene terephthalate, polycarbonate, polyacetal (polyoxymethylene), polyamide, modified polyphenylene ether, polybutylene terephthalate, polyphenylene sulfide, polyether ether ketone, or polyether imide. That is, in the present invention, the base resin is preferably made of a so-called general-purpose engineering plastic or a so-called super engineering plastic. In the present invention, a general-purpose engineering plastic or a super engineering plastic other than the above can also be used for the base resin. It is preferable that the base resin used for the present invention is a thermoplastic resin.

The carbon filler used in the present invention is generally; a monolayer carbon nanotube, a multilayer carbon nanotube, a vapor grown carbon fiber, a nanografiber, a carbon nanohorn, a cup stack type carbon nanotube, a monolayer fullerene, a multilayer fullerene, or the aforementioned carbon fillers doped with boron. Preferably the carbon filler is contained as 0.2 to 60% by weight of the total weight of the filler containing resin. Or preferably the carbon filler is contained as 0.1 to 30% by volume of the total volume of the filler containing resin.

Preferably the monolayer carbon nanotube has a diameter of 0.4 to 2 nm, and an aspect ratio (length/diameter) of 10 to 1000, specifically an aspect ratio of 50 to 100. The monolayer carbon nanotube is formed in a hexagon shaped netlike having a cylindrical shape or a truncated-cone shape, and is a monolayer structure. The monolayer carbon nanotube can be obtained from Carbon Nanotechnologies Inc. (CNI) in the U.S.A. as "SWNT".

Preferably the multilayer carbon nanotube has a diameter of 2 to 4 nm, and an aspect ratio of 10 to 1000, specifically an aspect ratio of 50 to 100. The multilayer carbon nanotube is formed in a hexagon shaped netlike having a cylindrical shape or a truncated-cone shape, and is a multilayer structure. The multilayer carbon nanotube can be obtained from NIKKISO as "MWNT".

Such carbon nanotubes are described in "Carbon Nanotubes and Accelerated Electronic Applications" ("Nikkei Science" March, 2001 issue, pp 52–62) and "The Challenge of Nano Materials" ("Nikkei Mechanical" December, 2001 issue, pp 36–57) by P. G. Collins et. al., or the like. Moreover, the configuration and the manufacturing method of carbon fiber-containing resin composition has been disclosed for example in Japanese Unexamined Patent Application, First Publication No. 2001-200096.

Preferably the vapor grown carbon fiber has a diameter of 50 to 200 nm, and an aspect ratio of 10 to 1000, specifically an aspect ratio of 50 to 100. The vapor grown carbon fiber is formed in a hexagon shaped netlike having a cylindrical shape or a truncated-cone shape, and is a multilayer structure. The vapor grown carbon fiber can be obtained from SHOWA DENKO as "VGCF (trademark)". The vapor grown carbon fiber has been disclosed for example in Japanese Unexamined Patent Application, First Publication No. H05-321039, Japanese Unexamined Patent Application, First Publication No. H07-150419, and Japanese Examined Patent Application, Second Publication No. H03-61768.

Preferably the nanografiber has an outer diameter of 2 to 500 nm, and an aspect ratio of 10 to 1000, an aspect ratio of 50 to 100 being particularly preferable. The nanografiber has an almost solid cylindrical shape. The nanografiber can obtained from ISE ELECTRON/now changed to NORITAKE ITRON CORP.

Preferably the carbon nanohorn has a diameter of 2 to 500 nm, and an aspect ratio of 10 to 1000, an aspect ratio of 50 to 100 being particularly preferable. The carbon nanohorn has an cup shape being a hexagon shaped netlike.

Preferably the cup stack type carbon nanotube has a shape where the carbon nanohorn is laminated into a cup shape, and an aspect ratio of 10 to 1000, an aspect ratio of 50 to 100 being particularly preferable.

Fullerene is a molecule which uses a carbon cluster as a parent. The definition of CAS, is that it is a molecule being a closed globular shape with 20 or more carbon atoms respectively combined with adjacent three atoms. Monolayer fullerene has a football like shape. Preferably the monolayer fullerene has a diameter of 0.1 to 500 nm. Preferably the composition of the monolayer fullerene is C60 to C540. The monolayer fullerene is for example C60, C70, and C120. The diameter of C60 is about 0.7 nm. Multilayer fullerene has a telescopic shape with the monolayer fullerene mentioned above concentrically laminated. Preferably the multilayer fullerene has a diameter of 0.1 nm to 1000 nm, a diameter of 1 nm to 500 nm being particularly preferable. Preferably the multilayer fullerene has a composition of C60 to C540. Preferably the multilayer fullerene has a configuration with for example C70 arranged on the outside of C60, and C120 arranged further on the outside of C70. Such multilayer fullerene has been described for example in "The Abundant Generation and Application to Lubricants of Onion Structured Fullerene" ("Japan Society for Precision Engineering" vol. 67, No. 7, 2001) by Takahiro Kakiuchi et. al.

Furthermore, the aforementioned carbon filler may also be made with any of the carbon fillers (a monolayer carbon nanotube, a multilayer carbon nanotube, a vapor grown carbon fiber, a nanografiber, a carbon nanohorn, a cup stack mold carbon nanotube, a monolayer fullerene, or a multilayer fullerene) doped with boron. The method of doping the carbon filler with boron is disclosed in Japanese Unexamined Patent Application, First Publication No. 2001-200096 or the like. In the method disclosed in Japanese Unexamined Patent Application, First Publication No. 2001-200096, the carbon fiber and boron manufactured by the gaseous-phase method, are mixed by means of a Henschel mixer type mixer, and this mixture is heat-treated at about 2300° C. in a high-frequency induction furnace or the like. Then, the heat-treated mixture is ground by a grinder. Next, the base resin and the ground mixture are blended at a predetermined rate, and melting and kneading carried out by an extruder in order to manufacture a pellet.

Referring to FIG. 1 to FIG. 4, a battery negative terminal 170 is attached to the main plate 102. The battery negative terminal 170 electrically connects the negative electrode of the battery 120 to the negative input section Vss of the IC 118 through the negative pattern of the circuit block 116. The battery clamp 172 is attached to the switch spring 162. The battery clamp 172 and the switch spring 162 electrically connect the positive electrode of the battery 120 and the positive input section Vdd of the IC 118 through the positive pattern of the circuit block 116.

Figure 3:
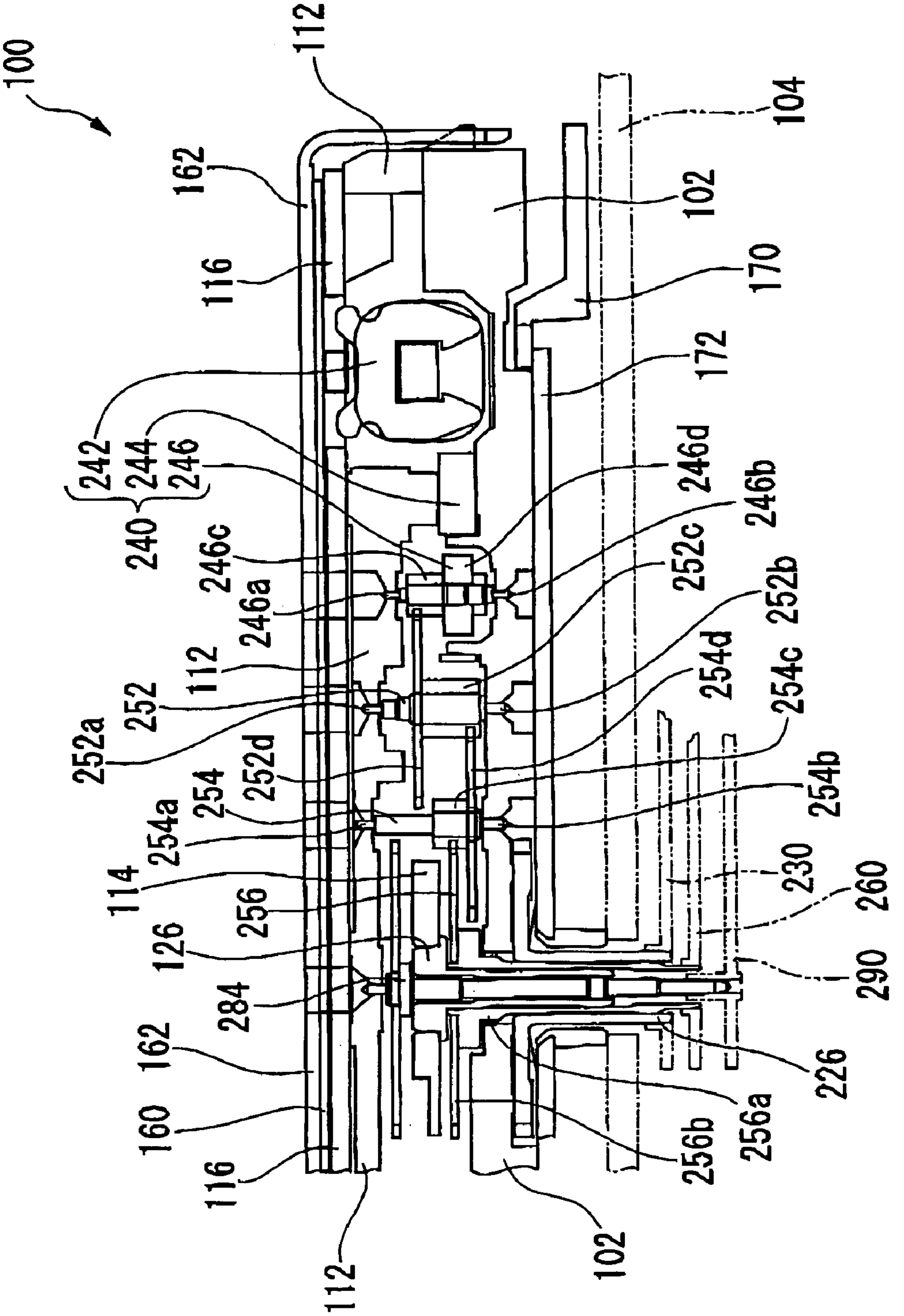
FIG. 3 is a schematic fragmentary sectional view showing a part from a minute motor to a minute hand, in the first embodiment of the present invention.

Referring to FIG. 1 and FIG. 3, a minute motor 240 includes a minute coil block 242, a minute stator 244, and a minute rotor 246. When the minute coil block 242 inputs a minute motor drive signal, the minute stator 244 is magnetized to rotate the minute rotor 246. The minute rotor 246 is configured for example so that it rotates 180 degrees per 20 seconds. The minute rotor 246 includes an upper-shaft section 246*a*, a lower-shaft section 246*b*, a pinion section 246*c*, and a rotor magnet 246*d*. The upper-shaft section 246*a*, the lower-shaft section 246*b*, and the pinion section 246*c* are formed from a metal such as carbon steel.

The configuration is such that, based on rotation of the minute rotor 246 a first minute transfer wheel 252 rotates, and based on rotation of the first minute transfer wheel 252 a minute wheel 256 rotates through rotation of a second minute transfer wheel 254. The first minute transfer wheel 252 includes an upper-shaft section 252*a*, a lower-shaft section 252*b*, a pinion section 252*c*, and a gear wheel section 252*d*. The pinion section 246*c* is configured so that it meshes with the gear wheel section 252*d*. The upper-shaft section 252*a*, the lower-shaft section 252*b*, and the pinion section 252*c* are formed from a metal such as carbon steel. The gear wheel section 252*d* is formed from a metal such as brass. The second minute transfer wheel 254 includes an upper-shaft section 254*a*, a lower-shaft section 254*b*, a pinion section 254*c*, and a gear wheel section 254*d*. The pinion section 254*c* is configured so that it meshes with the gear wheel section 254*d*. The upper-shaft section 254*a*, the lower-shaft section 254*b*, and the pinion section 254*c* are formed from a metal such as carbon steel. The gear wheel section 254*d* is formed from a metal such as brass. The minute wheel 256 includes a cylindrical section 256*a* and a gear wheel section 256*d*. The pinion section 254*c* is configured so that it meshes with the gear wheel section 256*d*.

The cylindrical section 256*a* is formed from a metal such as carbon steel. The gear wheel sections 254*d* is formed from a metal such as brass.

The minute wheel 256 is configured so that it rotates once per hour. The minute hand 260 is attached to the minute wheel 256. The center of rotation of the minute wheel 256 is the same as the center of rotation of the second wheel 284. The minute hand 260 constitutes a minute display member. Any one of a minute hand, a disk, and other display members in floral or geometric patterns may be used for the minute display member.

The minute display wheel train 250 includes the first minute transfer wheel 252, the second minute transfer wheel 254, and the minute wheel 256. The minute rotor 246, the first minute transfer wheel 252, and the second minute transfer wheel 254 are rotatably supported with respect to the main plate 102 and the wheel train bridge 112. The minute wheel 256 is rotatably supported and contacts with a periphery of a center pipe 126 provided on the second bridge 114. That is, the upper-shaft section 246*a* of the minute rotor 246, the upper-shaft section 252*a* of the first minute transfer wheel 252, and the upper-shaft section 254*a* of the second minute transfer wheel 254 are rotatably supported with respect to the wheel train bridge 112. Moreover, the lower-shaft section 246*b* of the minute rotor 246, the lower-shaft section 252*b* of the first minute transfer wheel 252, and the lower-shaft section 254*b* of the second minute transfer wheel 254 are rotatably supported with respect to the main plate 102.

Figure 4:
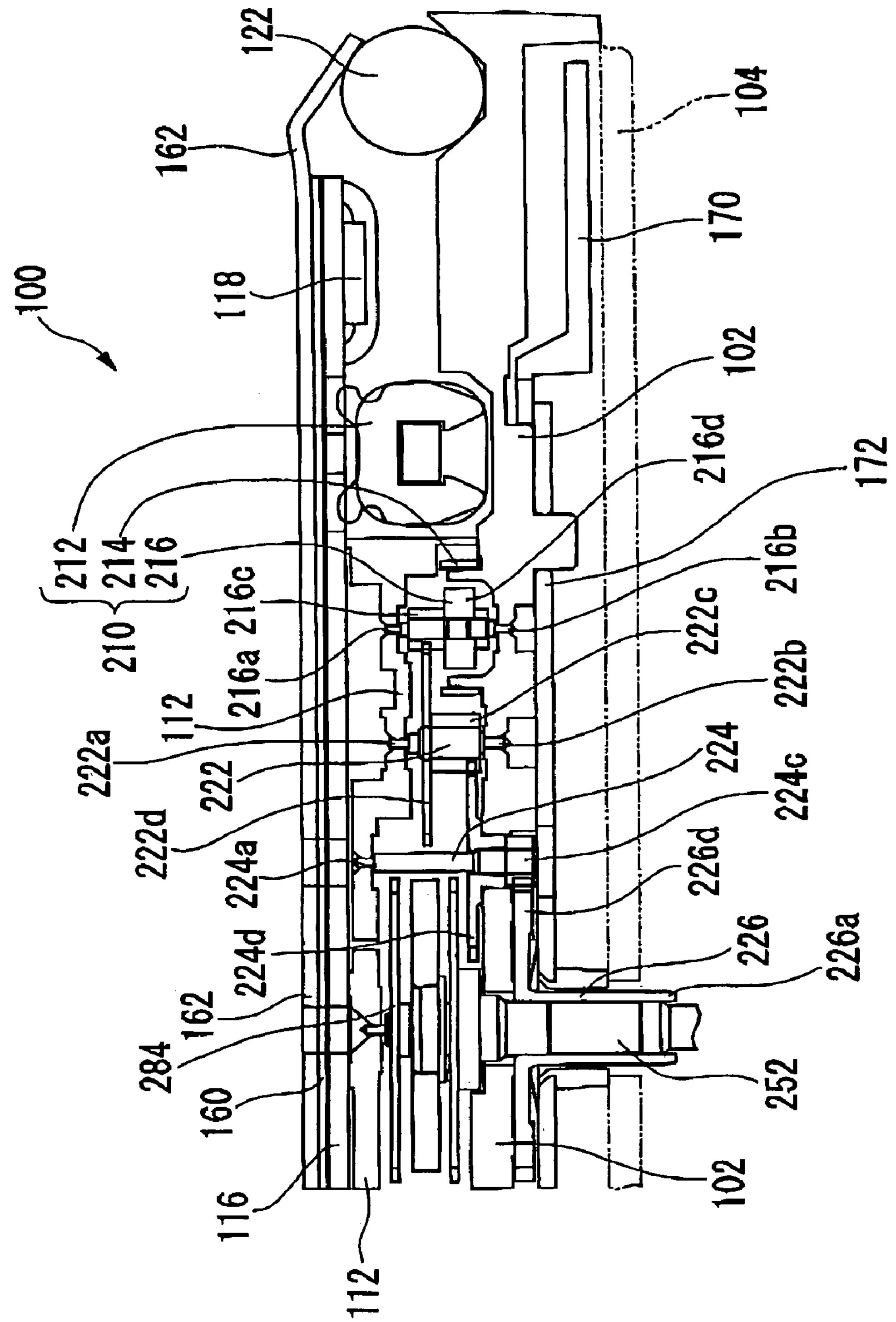
FIG. 4 is a schematic fragmentary sectional view showing a part from an hour motor to an hour hand, in the first embodiment of the present invention.

Referring to FIG. 1 and FIG. 4, an hour motor 210 includes an hour coil block 212, an hour stator 214, and an hour rotor 216. When the hour coil block 212 inputs an hour motor drive signal, the hour stator 214 is magnetized to rotate the hour rotor 216. The hour rotor 216 is configured for example so that it rotates 180 degrees per 20 minutes. The hour rotor 216 includes an upper-shaft section 216*a*, a lower-shaft section 216*b*, a pinion section 216*c*, and a rotor magnet 216*d*. The upper-shaft section 216*a*, the lower-shaft section 216*b*, and the pinion section 216*c* are formed from a metal such as carbon steel.

The hour wheel 226 is configured so that it rotates once per 12 hours. The hour hand 230 is attached to the hour wheel 226. The center of rotation of the hour wheel 226 is the same as the center of rotation of the minute wheel 256. Therefore, the center of rotation of the hour wheel 226, the center of rotation of the minute wheel 256, and the center of rotation of the second wheel 284 are the same. The hour hand 230 constitutes an hour display member. The hour display wheel train 220 includes the first hour transfer wheel 222, the second hour transfer wheel 224, and the hour wheel 226. The hour rotor 216, the first hour transfer wheel 222, and the second hour transfer wheel 224 are rotatably supported with respect to the main plate 102 and the wheel train bridge 112. The hour wheel 226 is rotatably supported and contacts with a periphery of the minute wheel 256. That is, the upper-shaft section 216*a* of the hour rotor 216, the upper-shaft section 222*a* of the first hour transfer wheel 222, and the upper-shaft section 224*a* of the second hour transfer wheel 224 are rotatably supported with respect to the wheel train bridge 112. Moreover, the lower-shaft section 216*b* of the hour rotor 216, the lower-shaft section 222*b* of the first hour transfer wheel 222, and the lower-shaft section 224*b* of the second hour transfer wheel 224 are rotatably supported with respect to the main plate 102.

The hour wheel 226 is configured so that it rotates once per 12 hours. The hour hand 230 is attached to the hour wheel 226. The center of rotation of the hour wheel 226 is the same as the center of rotation of the minute wheel 256. Therefore, the center of rotation of the hour wheel 226, the center of rotation of the minute wheel 256, and the center of rotation of the second wheel 284 are the same. The hour hand 230 constitutes an hour display member. Any one of an hour hand, a disk, and other display members in floral or geometric patterns may be used for the hour display member.

The hour display wheel train 220 includes the first hour transfer wheel 222, the second hour transfer wheel 224, and the hour wheel 226. The hour rotor 216, the first hour transfer wheel 222, and the second hour transfer wheel 224 are rotatably supported with respect to the main plate 102 and the wheel train bridge 112. The hour wheel 226 is rotatably supported and contacts with a periphery of the minute wheel 256. That is, the upper-shaft section 216*a* of the hour rotor 216, the upper-shaft section 222*a* of the first hour transfer wheel 222, and the upper-shaft section 224*a* of the second hour transfer wheel 224 are rotatably supported with respect to the wheel train bridge 112. Moreover, the lower-shaft section 216*b* of the hour rotor 216, the lower-shaft section 222*b* of the first hour transfer wheel 222, and the lower-shaft section 224*b* of the second hour transfer wheel 224 are rotatably supported with respect to the main plate 102. The configuration is such that a date driving pawl (not shown) rotates due to the rotation of the hour wheel 226. The day wheel is provided so that it rotates once per day due to rotation of the hour wheel 226. The configuration is such that a date driving wheel (not shown) provided on the day wheel forwards the date dial 170 by one tooth per day.

As a modified example, at least the upper-shaft section 276*a* and the lower-shaft section 276*b* of the second rotor 276 (or, all the rotor ancillaries of the second rotor 276) and at least the upper-shaft section 282*a* and the lower-shaft section 282*b* the second transfer wheel 282 may be formed from a filler containing resin having a base resin of thermoplastic resin and carbon filler mixed with this base resin. The upper-shaft section 276*a*, the lower-shaft section 276*b*, and the pinion section 276*c* of the second rotor 276, and the whole second transfer wheel 282 are preferably formed from the filler containing resin. If the second rotor 276 and the second transfer wheel 282 are formed from the filler containing resin, the likelihood of wear of the shaft section can be reduced.

Moreover, as a modified example, at least the upper-shaft section 246*a* and the lower-shaft section 246*b* of the minute rotor 246 (or, all the rotor ancillaries of the minute rotor 246), at least the upper-shaft section 252*a* and the lower-shaft section 252*b* of the first minute transfer wheel 252, and at least the upper-shaft section 254*a* and the lower-shaft section 254*b* of the second minute transfer wheel 254 may be formed from a filler containing resin having a base resin of thermoplastic resin and carbon filler mixed with this base resin. The upper-shaft section 246*a*, the lower-shaft section 246*b*, and the pinion section 246*c* of the minute rotor 246, the whole first minute transfer wheel 252, and the whole second minute transfer wheel 254 are preferably formed from the filler containing resin. If the second rotor 246, the first minute transfer wheel 252, and the second minute transfer wheel 254 are formed from the aforementioned filler containing resin, the likelihood of wear of the shaft section can be reduced.

Moreover, as a modified example, at least the upper-shaft section 216*a* and the lower-shaft section 216*b* of the hour rotor 216 (or, all the rotor ancillaries of the hour rotor 216), at least the upper-shaft section 222*a* and the lower-shaft section 222*b* of the first hour transfer wheel 222, and at least the upper-shaft section 224*a* and the lower-shaft section 224*b* of the second hour transfer wheel 224 may be formed from a filler containing resin having a base resin of thermoplastic resin and carbon filler mixed with this base resin. The upper-shaft section 246*a*, the lower-shaft section 246*b*, and the pinion section 246*c* of the hour rotor 216, the whole first hour transfer wheel 222, and the whole second hour transfer wheel 224 are preferably formed from the aforementioned filler containing resin. If the hour rotor 216, the first hour transfer wheel 222, and the second hour transfer wheel 224 are formed from the filler containing resin, the likelihood of wear of the shaft section can be reduced.

(Second Embodiment)

Figure 5:
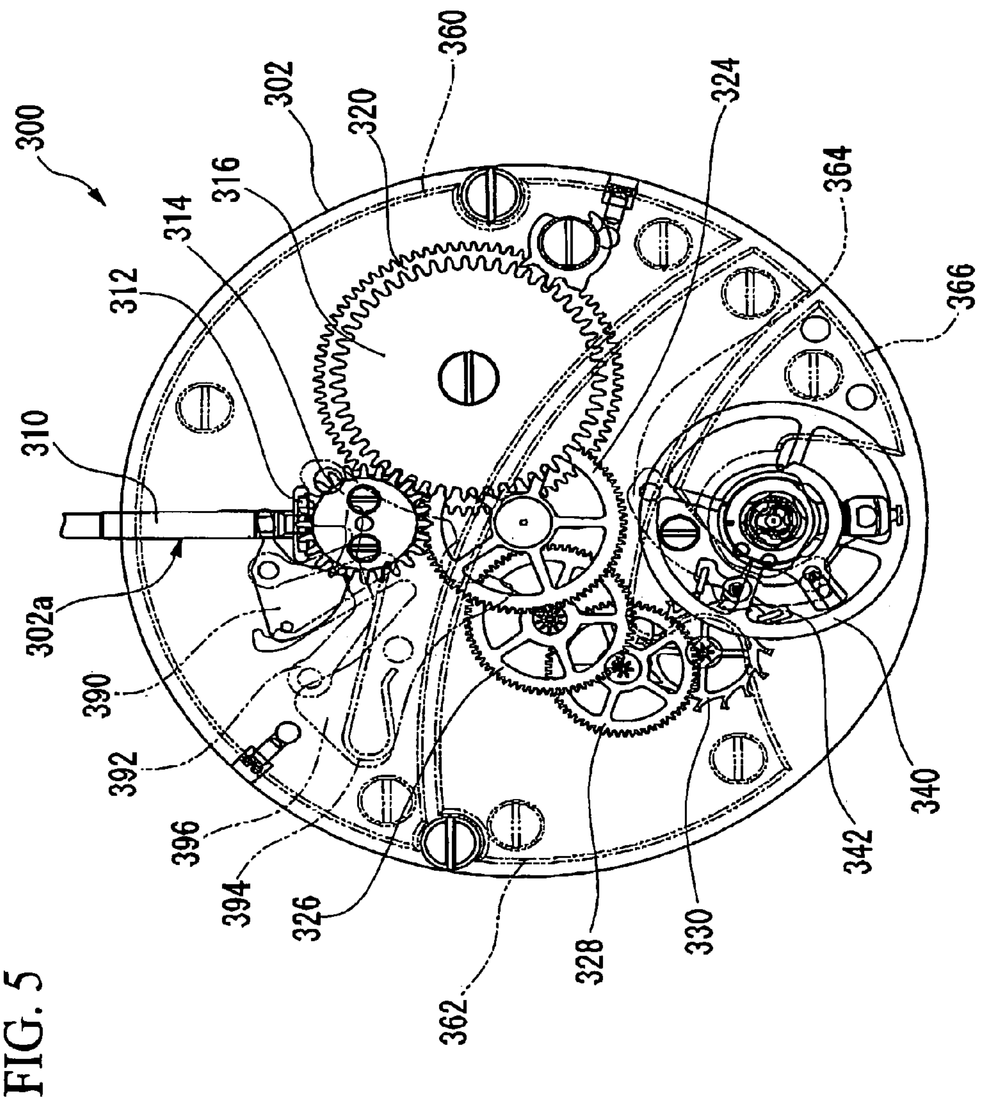
FIG. 5 is a plan view showing a schematic configuration of a movement seen from the obverse side, in a second embodiment of the present invention (some components are omitted in FIG. 5, and the imaginary lines denote bridge members).
Figure 6:
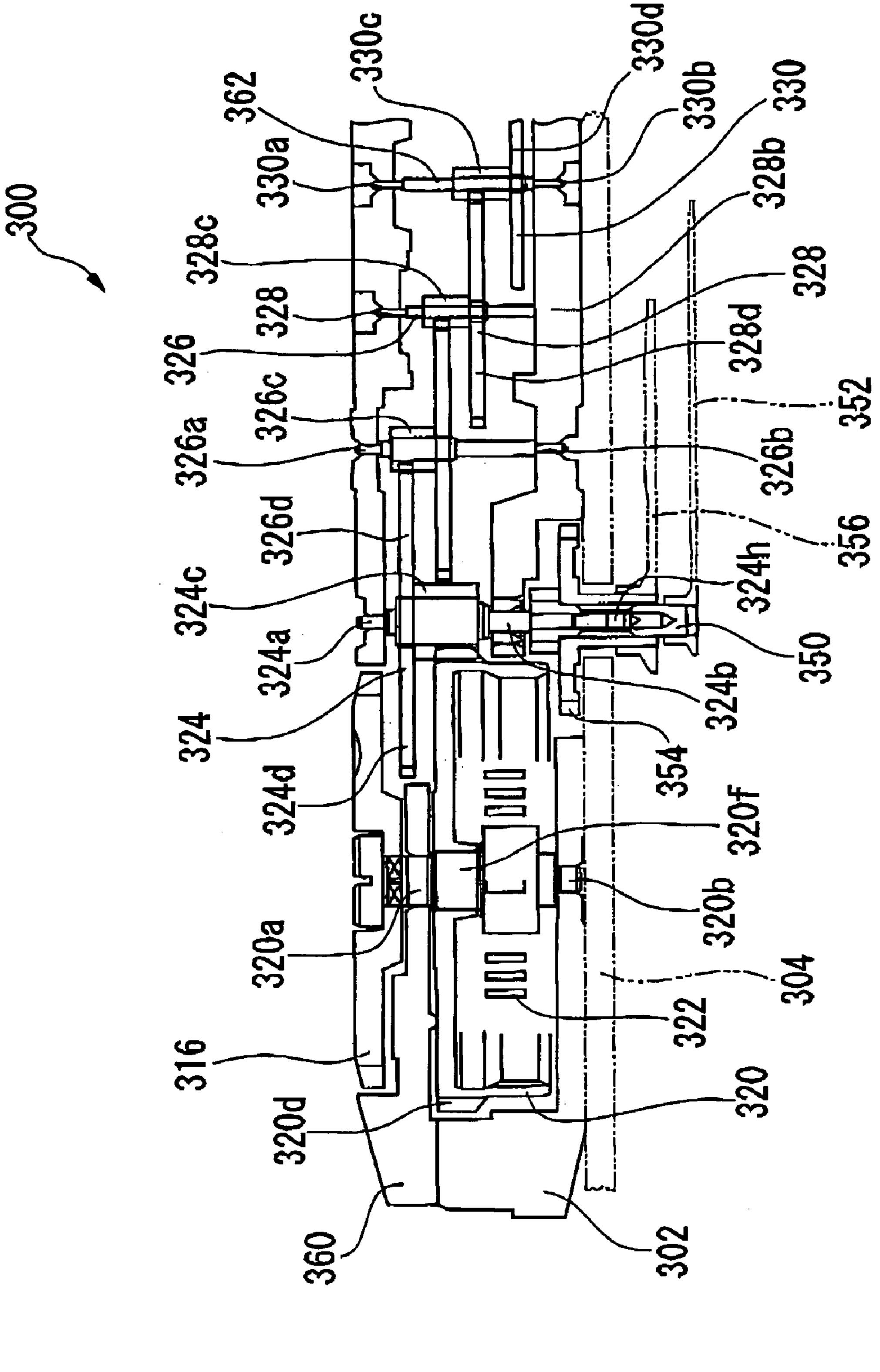
FIG. 6 is a schematic fragmentary sectional view showing a part from a barrel drum to an pallet fork, in the second embodiment of the present invention.
Figure 7:
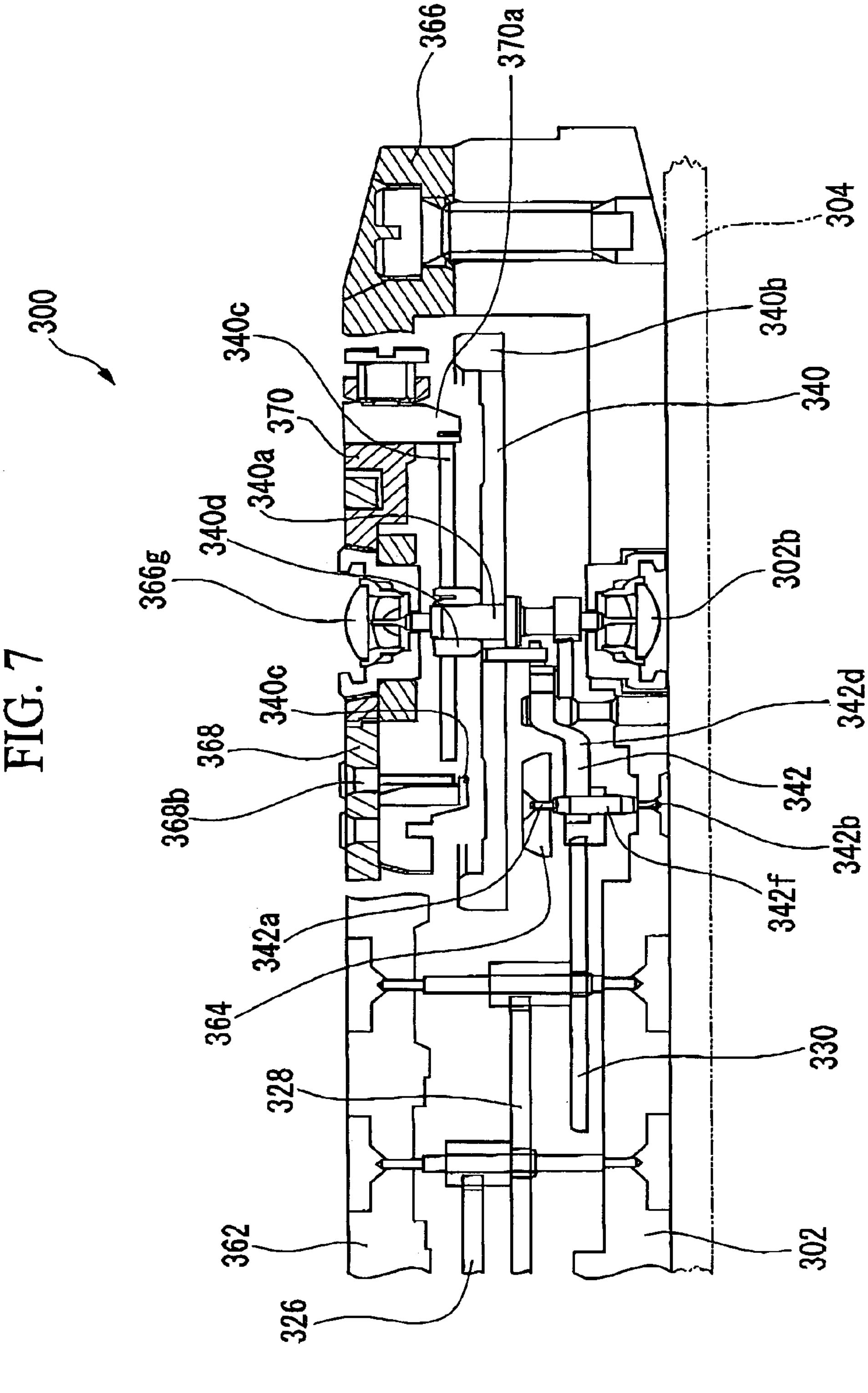
FIG. 7 is a schematic fragmentary sectional view showing a part from an escape wheel-and-pinion to a balance complete, in the second embodiment of the present invention.

Next is the description of a second embodiment of the present invention. The second embodiment of the present invention is a mechanical timepiece including a wheel train. Referring to FIG. 5 to FIG. 7, in the mechanical timepiece, a movement (machine body) 300 of the mechanical timepiece has a main plate 302 constituting the substrate of the movement. A hand setting stem 310 is rotatably built in to a hand setting stem guiding hole 302*a* of the main plate 302. A dial 304 (denoted by imaginary lines in FIG. 26) is installed in the movement 300. Generally, of the two sides of the main plate, the side with the dial is called the "back side" of the movement, and the opposite side to the side with the dial is called the "obverse side" of the movement. The wheel train built in to the "obverse side" of the movement is called a "front wheel train", and the wheel train built in to the "back side" of the movement is called a "back wheel train".

The position in the axial direction of the hand setting stem 310 is determined by a changeover device including a setting lever 390, a yoke 392, a setting lever spring 394, and a back holder 396. A winding pinion 312 is rotatably provided on a guiding shaft section of the hand setting stem 310. If the hand setting stem 310 is rotated in a condition with the hand setting stem 310 in a first hand setting stem position (0th step) nearest to the inside of the movement along the axial direction of rotation, the winding pinion 312 will rotate through rotation of a clutch wheel. A round-holed wheel 314 rotates by rotation of the winding pinion 312. A square-holed wheel 316 rotates by rotation of the round-holed wheel 314. By rotation of the square-holed wheel 316, a mainspring 322 accommodated in a barrel complete 320 is wound up. A second wheel-and-pinion 324 rotates by rotation of the barrel complete 320. An escape wheel-and-pinion 330 rotates through rotation of a fourth wheel-and-pinion 328, a third wheel-and-pinion 326, and the second wheel-and-pinion 324. The barrel complete 320, the second wheel-and-pinion 324, the third wheel-and-pinion 326 and the fourth wheel-and-pinion 328 constitute the front wheel train.

An escapement and a speed governor for controlling rotation of the front wheel train, contain a balance complete 340, an escape wheel-and-pinion 330, and a pallet fork 342. The balance complete 340 includes a balance staff 340*a*, a balance wheel 340*b*, and a hair spring 340*c*. Based on rotation of the second wheel-and-pinion 324, a cannon pinion 350 rotates at the same time. A minute hand 352 attached to the cannon pinion 350 displays "minutes". A slip mechanism for the second wheel-and-pinion 324 is provided in the cannon pinion 350. Based on rotation of the cannon pinion 350, an hour wheel 354 rotates through rotation of the minute wheel-and-pinion. An hour hand 356 attached to the hour wheel 354 displays "time". The hair spring 340*c* is a thin plate spring in a spiral (helix) shape with two or more turns. The inner end of the hair spring 340*c* is fixed to a collet 340*d* fixed to the balance staff 340*a*, and the outer end of the hair spring 340*c* is fixed by a thread fastening via a stud support 370*a* fitted to a stud 370 fixed to a balance cock 366. A slow-fast needle 368 is rotatably attached to the balance cock 366. A regulator key 1340 and a regulator pin 1342 are attached to the slow-fast needle 368. The part near the outer end of the hair spring 340*c* is located between the regulator key 1340 and the regulator pin 1342. The balance complete 340 is rotatably supported with respect to the main plate 302 and the balance cock 366.

The barrel complete 320 is provided with a barrel drum gear wheel 320*d*, a barrel arbor 320*f*, and a mainspring 322. The barrel arbor 320*f* includes an upper-shaft section 320*a* and a lower-shaft section 320*b*. The barrel arbor 320*f* is formed from a metal such as carbon steel. The barrel drum gear wheel 320*d* is formed from a metal such as brass. The second wheel-and-pinion 324 includes an upper-shaft section 324*a*, a lower-shaft section 324*b*, a pinion section 324*c*, a gear wheel section 324*d*, and a bead section 324*h*. The pinion section 324*c* is configured so that it meshes with the barrel drum gear wheel 320*d*. The upper-shaft section 324*a*, the lower-shaft section 324*b*, and the bead section 324*b* are formed from a metal such as carbon steel. The gear wheel section 324*d* is formed from a metal such as brass. The third wheel-and-pinion 326 includes an upper-shaft section 326*a*, a lower-shaft section 326*b*, a pinion section 326*c*, and a gear wheel section 326*d*. The pinion section 326*c* is configured so that it meshes with the gear wheel section 324*d*. The upper-shaft section 326*a*, the lower-shaft section 326*b*, and the pinion section 326*c* are formed from a metal such as carbon steel. The gear wheel section 326*d* is formed from a metal such as brass. The fourth wheel-and-pinion 328 contains an upper-shaft section 328*a*, a lower-shaft section 328*b*, a pinion section 328*c*, and a gear wheel section 328*d*. The pinion section 328*c* is configured so that it meshes with the gear wheel section 326*d*. The upper-shaft section 328*a*, the lower-shaft section 328*b*, and the pinion section 328*c* are formed from a metal such as carbon steel. The gear wheel section 328*d* is formed from a metal such as brass.

The escape wheel-and-pinion 330 includes an upper-shaft section 330*a*, a lower-shaft section 330*b*, a pinion section 330*c*, and a gear wheel section 330*d*. The pinion section 330*c* is configured so that it meshes with the gear wheel section 328*d*. The upper-shaft section 330*a* and the lower-shaft section 330*b* are formed from a metal such as carbon steel. The gear wheel section 330*d* is formed from a metal such as iron. The pallet fork 342 is provided with an anchor-escapement body 342*d* and an anchor-escapement center 342*f*. The anchor-escapement center 342*f* includes an upper-shaft section 342*a* and a lower-shaft section 342*b*. The anchor-escapement body 342*d* is formed from a metal such as nickel. The anchor-escapement center 342*f* is formed from a metal such as carbon steel.

The barrel complete 320 is rotatably supported with respect to the main plate 302 and the barrel drum bridge 360. That is, the upper-shaft section 320*a* of the barrel arbor 320*f* is rotatably supported with respect to the barrel drum bridge 360. The lower-shaft section 320*b* of barrel arbor 320*f* is rotatably supported with respect to the main plate 302. The second wheel-and-pinion 324, the third wheel-and-pinion 326, the fourth wheel-and-pinion 328 and the escape wheel-and-pinion 330 are rotatably supported with respect to the main plate 302 and the wheel train bridge 362. That is, the upper-shaft section 324*a* of the second wheel-and-pinion 324, the upper-shaft section 326*a* of the third wheel-and-pinion 326, the upper-shaft section 328*a* of the fourth wheel-and-pinion 328 and the upper-shaft section 330*a* of the escape wheel-and-pinion 330 are rotatably supported with respect to the wheel train bridge 362. Moreover, the lower-shaft section 324*b* of the second wheel-and-pinion 324, the lower-shaft section 326*b* of the third wheel-and-pinion 326, the lower-shaft section 328*b* of the fourth wheel-and-pinion 328, and the lower-shaft section 330*b* of the escape wheel-and-pinion 330 are rotatably supported with respect to the main plate 302.

The pallet fork 342 is rotatably supported with respect to the main plate 302 and the anchor escapement bridge 364. That is, the upper-shaft section 342*a* of the pallet fork 342 is rotatably supported with respect to the anchor escapement bridge 364. The lower-shaft section 342*b* of the pallet fork 342 is rotatably supported with respect to the main plate 302. The main plate 302, the barrel drum bridge 360, the wheel train bridge 362, and the anchor escapement bridge 364 are formed from a filler containing resin having a base resin of thermoplastic resin and carbon filler mixed with this base resin. If the main plate 302, the barrel drum bridge 360, the wheel train bridge 362, and the anchor escapement bridge 364 are formed from the filler containing resin, the likelihood of wear of the bearing section can be reduced.

In the second embodiment of the present invention, the filler containing resin used for the main plate 302, the barrel drum bridge 360, the wheel train bridge 362, and the anchor escapement bridge 364, is the same as the filler containing resin used for the main plate 102 and the wheel train bridge 162. Therefore, the description regarding the filler containing resin, the base resin, and the carbon filler in the first embodiment of the present invention above mentioned is applied here.

As a modified example, at least the upper-shaft section 326*a* and the lower-shaft section 326*b* of the third wheel-and-pinion 326, and at least the upper-shaft section 328*a* and the lower-shaft section 328*b* of the fourth wheel-and-pinion 328 may be formed from a filler containing resin having a base resin of thermoplastic resin and carbon filler mixed with this base resin. The whole third wheel-and-pinion 326 and the whole fourth wheel-and-pinion 328 are preferably formed from the aforementioned filler containing resin. If the third wheel-and-pinion 326 and the fourth wheel-and-pinion 328 are formed from the filler containing resin, the likelihood of wear of the shaft section can be reduced.

(Third Embodiment)

Next is the description of a third embodiment of the present invention.

The description hereunder is mainly regarding the point where the third embodiment of the present invention is different from the first embodiment of the present invention. Therefore, except for the contents described hereunder, the description in the first embodiment of the present invention mentioned above is applied here.

Figure 8:
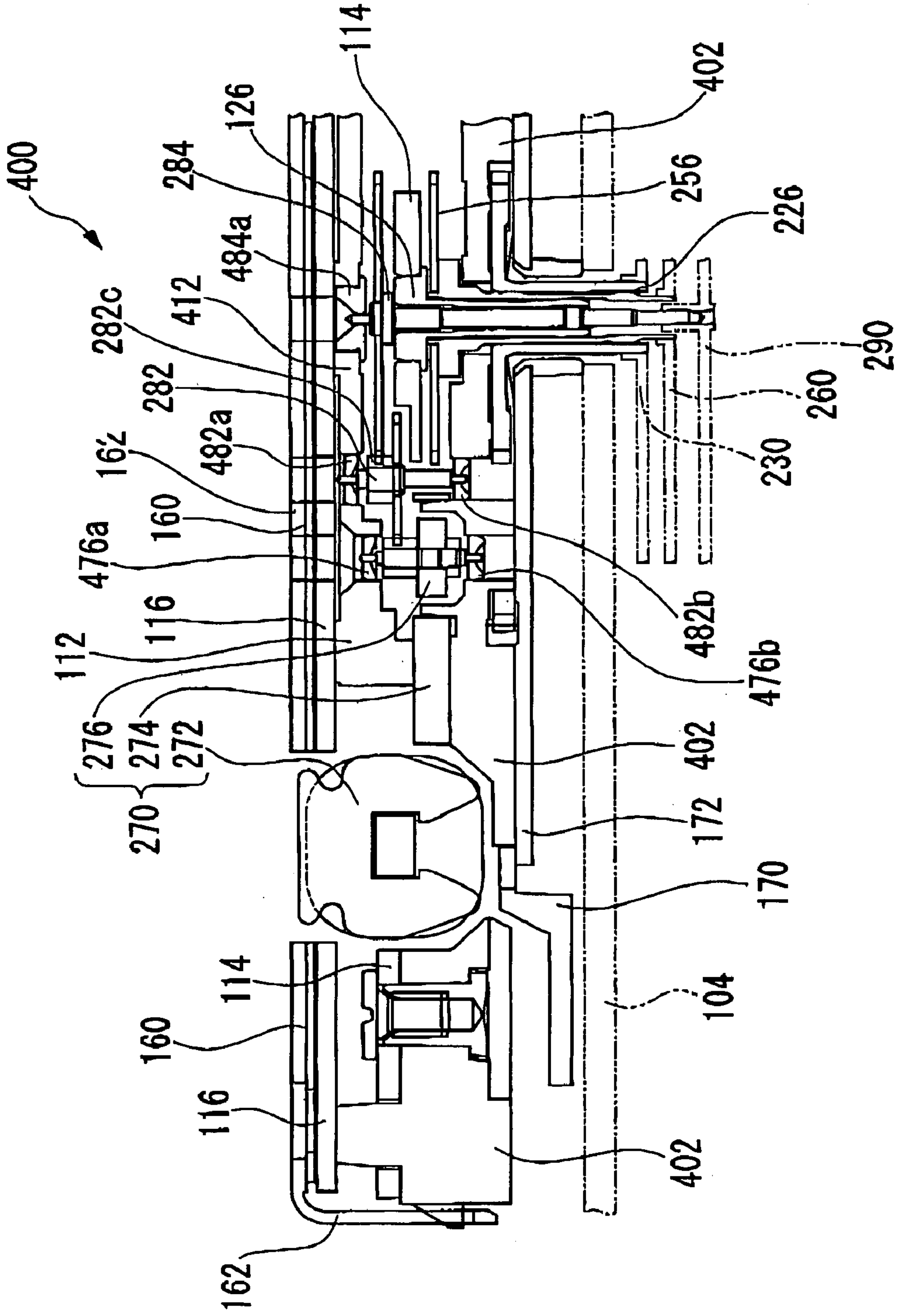
FIG. 8 is a schematic fragmentary sectional view showing a part from a second motor to a second hand, in a third embodiment of the present invention.

Referring to FIG. 8, in an analog electronic timepiece, a movement (machine body) 400 of the analog electronic timepiece has a main plate 402 constituting a substrate of the movement. A second rotor 276 and a second transfer wheel 282 are rotatably supported with respect to the main plate 402 and a wheel train bridge 412. That is, an upper-shaft section 276*a* of the second rotor 276 is rotatably supported with respect to a pivot frame 476*a* above the second rotor, provided on the wheel train bridge 412. An upper-shaft section 282*a* of the second transfer wheel 282 is rotatably supported with respect to a pivot frame 482*a* above the second transfer wheel, provided on the wheel train bridge 412. An upper-shaft section 284*a* of a second wheel 284 is rotatably supported with respect to a pivot frame 484*a* above the second wheel, provided on the wheel train bridge 412. Moreover, a lower-shaft section 276*b* of the second rotor 276 is rotatably supported with respect to a pivot frame 476*b* under the second rotor, provided on the main plate 402. A lower-shaft section 282*b* of the second transfer wheel 282 is rotatably supported with respect to a pivot frame 482*b* under the second transfer wheel, provided on the main plate 402. The upper-shaft sections of the rotor and the gear besides the above are rotatably supported with respect to respective pivot frames (not shown) provided on the wheel train bridge 412. Moreover, the lower-shaft sections of the rotor and the gear besides the above are rotatably supported with respect to respective pivot frames (not shown) provided on the main plate 402.

The main plate 402 and the wheel train bridge 412 are formed from a metal such as brass. Alternatively, the main plate 402 and the wheel train bridge 412 may be formed from a plastic such as polycarbonate. The respective pivot frames are formed from a filler containing resin used for the main plate 102 and the wheel train bridge 162 in the first embodiment of the present invention. The filler containing resin used for the pivot frames in the third embodiment of the present invention is the same as the filler containing resin used for the main plate 102 and the wheel train bridge 162 in the first embodiment of the present invention. Therefore, the description regarding the filler containing resin, the base resin, and the carbon filler in the first embodiment of the present invention mentioned above is applied here.

(Fourth Embodiment)

Next is the description of a fourth embodiment of the present invention.

The description hereunder is mainly regarding the point where the fourth embodiment of the present invention is different from the second embodiment of the present invention. Therefore, except for the contents described hereunder, the description in the second embodiment of the present invention mentioned above is applied here.

Figure 9:
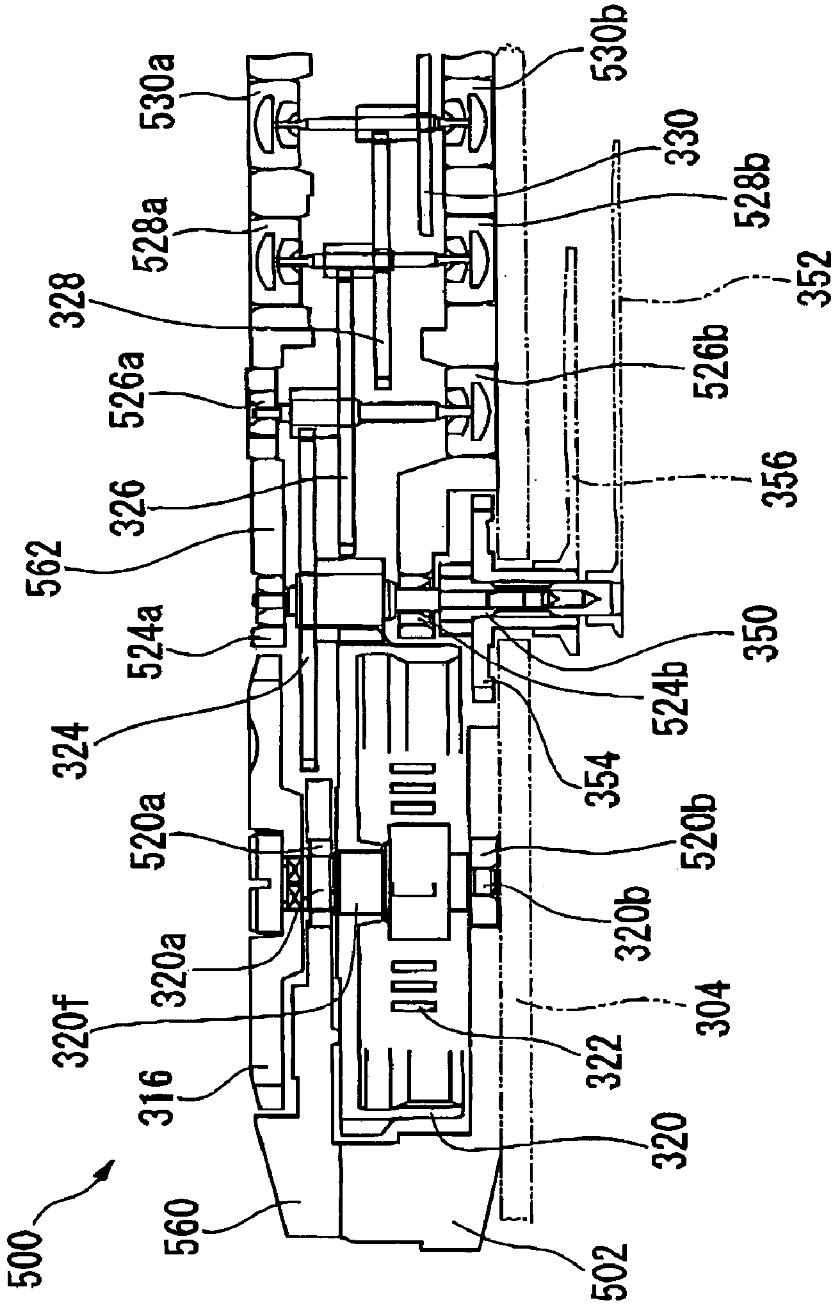
FIG. 9 is a schematic fragmentary sectional view showing a part from a barrel drum to a pallet fork, in a fourth embodiment of the present invention.
Figure 10:
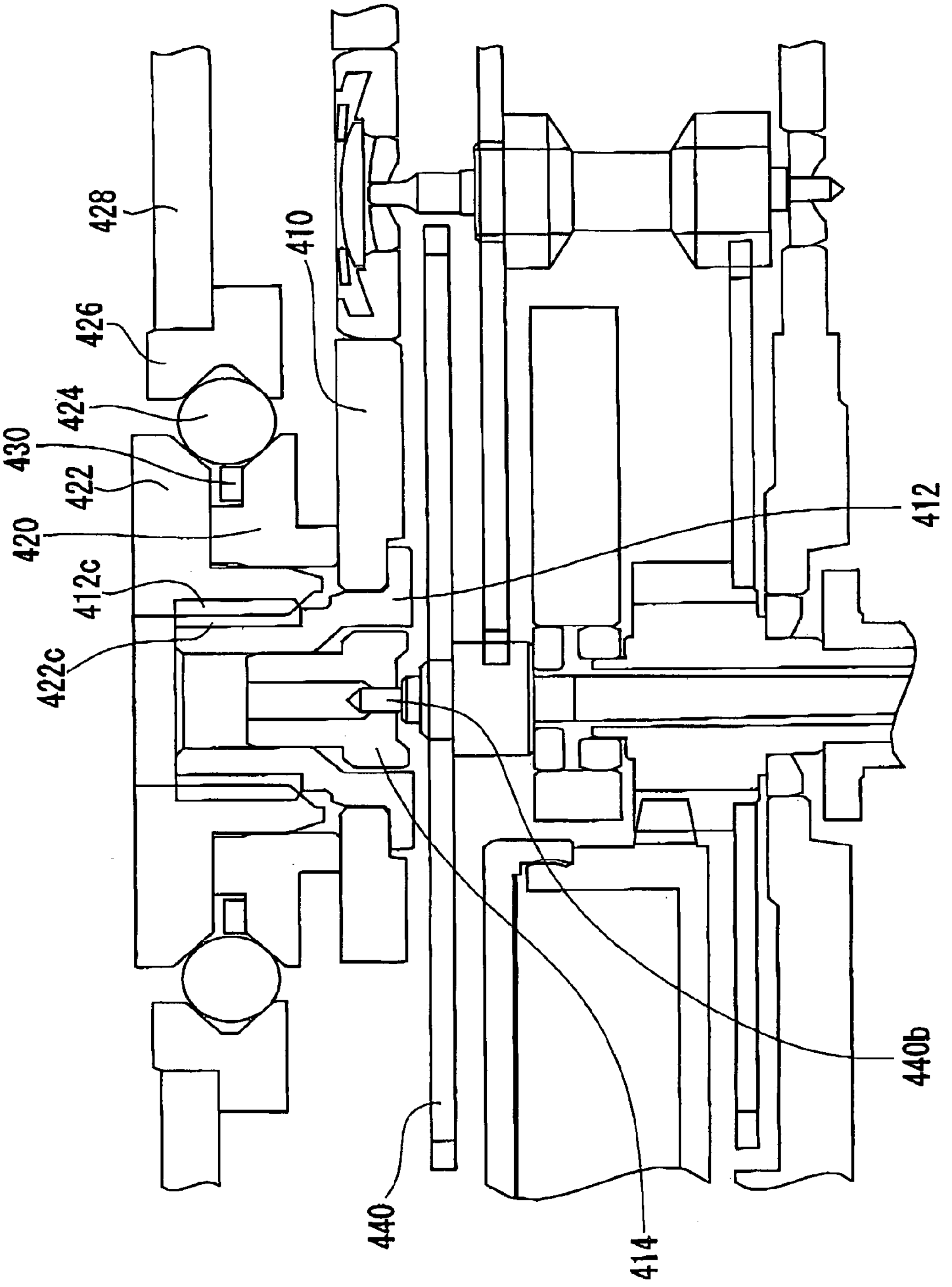
FIG. 10 is a schematic fragmentary sectional view showing a retaining section of a weight in a fourth embodiment of the present invention.

Referring to FIG. 9, in a mechanical timepiece, a movement (machine body) 400 of the mechanical timepiece has a main plate 502 constituting a substrate of the movement. A barrel complete 320 is rotatably supported with respect to the main plate 502 and a barrel drum bridge 560. That is, an upper-shaft section 320*a* of a barrel arbor 320*f* is rotatably supported with respect to a pivot frame 520*a* above the barrel drum, provided on the barrel drum bridge 560. A lower-shaft section 320*b* of the barrel arbor 320*f* is rotatably supported with respect to a pivot frame 520*b* under the barrel drum, provided on the main plate 502.

A second wheel-and-pinion 324, a third wheel-and-pinion 326, a fourth wheel-and-pinion 328, and an escape wheel-and-pinion 330 are rotatably supported with respect to the main plate 502 and a wheel train bridge 562. That is, an upper-shaft section 324*a* of the second wheel-and-pinion 324 is rotatably supported with respect to a pivot frame 524*a* above second wheel-and-pinion, provided on the wheel train bridge 562. An upper-shaft section 326*a* of the third wheel-and-pinion 326 is rotatably supported with respect to a pivot frame 526*a* above the third wheel-and-pinion, provided on the wheel train bridge 562. An upper-shaft section 328*a* of the fourth wheel-and-pinion 328 is rotatably supported with respect to a pivot frame 528*a* above the fourth wheel-and-pinion, provided on the wheel train bridge 562. An upper-shaft section 330*a* of the escape wheel-and-pinion 330 is rotatably supported with respect to a pivot frame 530*a* above the escape wheel-and-pinion, provided on the wheel train bridge 562. Moreover, a lower-shaft section 324*b* of the second wheel-and-pinion 324 is rotatably supported with respect to a pivot frame 524*b* under the second wheel-and-pinion, provided on the main plate 502. A lower-shaft section 326*b* of the third wheel-and-pinion 326 is rotatably supported with respect to a pivot frame 526*b* under the third wheel-and-pinion, provided on the main plate 502. A lower-shaft section 328*b* of the fourth wheel-and-pinion 328 is rotatably supported with respect to a pivot frame 528*b* under the fourth wheel-and-pinion, provided on the main plate 502. A lower-shaft section 330*b* of the escape wheel-and-pinion 330 is rotatably supported with respect to a pivot frame 530*b* under the escape wheel-and-pinion, provided on the main plate 502.

An pallet fork (not shown) is rotatably supported with respect to an anchor escapement bridge (not shown). That is, an upper-shaft section of the pallet fork is rotatably supported with respect to a pivot frame above the pallet fork (not shown), provided on the anchor escapement bridge. A lower-shaft section of the pallet fork is rotatably supported with respect to a pivot frame under pallet fork (not shown), provided on the main plate 502. The respective pivot frames mentioned above are formed from a filler containing resin used for the main plate 102 and the wheel train bridge 162 in the first embodiment of the present embodiment.

Figure 11:
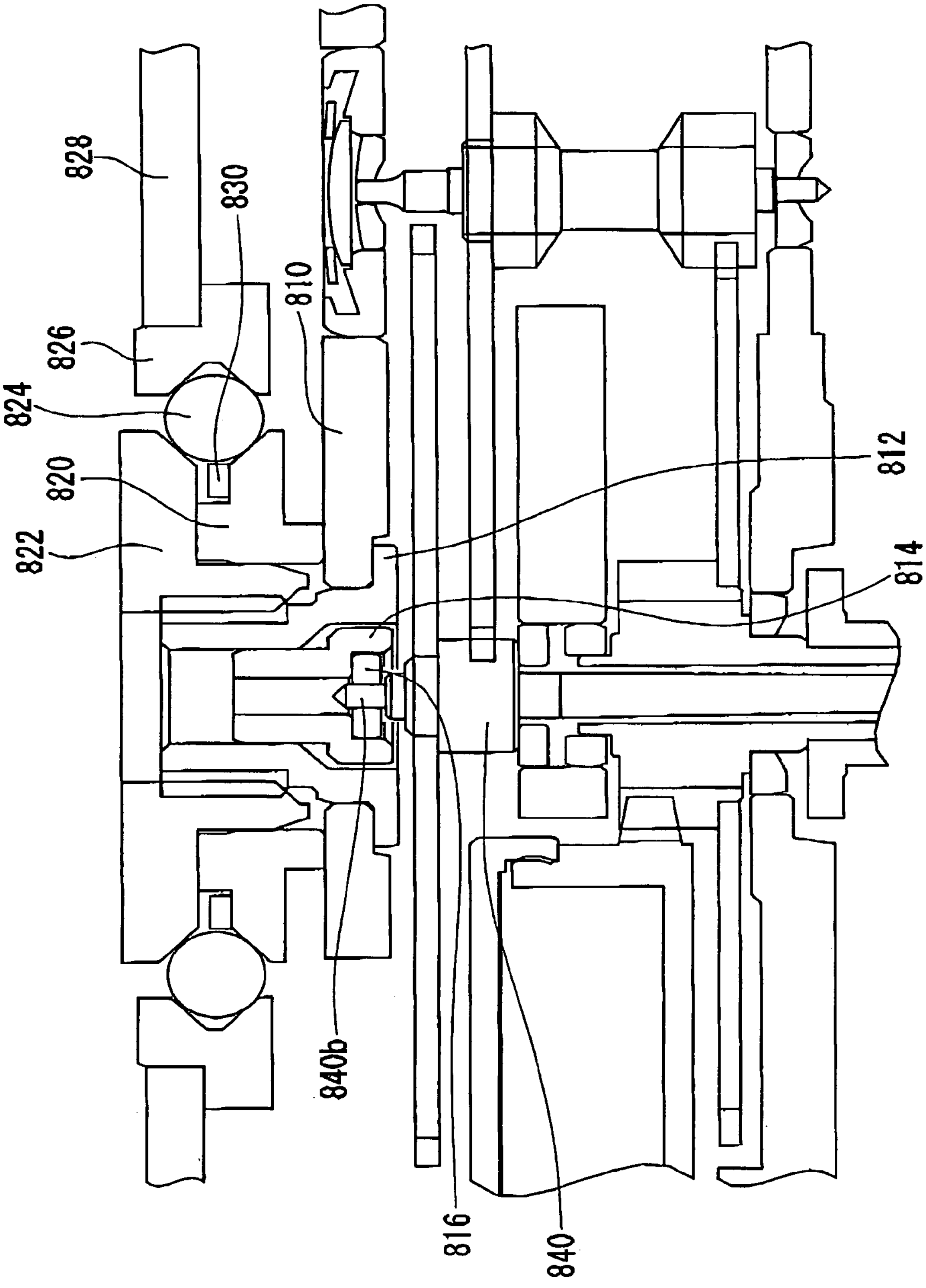
FIG. 11 is a schematic fragmentary sectional view showing a retaining section of a rotation plummet in a conventional automatic winding timepiece.

Furthermore, referring to FIG. 11, a oscillating weight shaft 412 is driven into a transfer bridge 410. A female screw section 422*c* of an inner ring 422 is screwed into a male screw section 412*c* of the oscillating weight shaft 412. The inner ring 422 and a ball stopper ring 420 rotatably support an outer ring 426 through a plurality of balls 424. A rotation plumb weight (not shown) is fixed onto the outer ring 426 through a rotation plumb body 428. A retainer 430 locates the plurality of balls 424 in the position between the inner ring 422, the ball stopper ring 420, and the outer ring 426. A fourth pivot frame 414 is driven into the central hole of the oscillating weight shaft 412. The fourth pivot frame 414 rotatably supports an upper-shaft section 440*b* of a fourth wheel-and-pinion 440. The fourth pivot frame 414 is formed from a filler containing resin used for the main plate 102 and the wheel train bridge 162 in the first embodiment of the present embodiment. As shown in FIG. 11, in the construction where the fourth pivot frame 414 formed from a filler containing resin is driven into the bridge members, there is extremely little likelihood of breaking the pivot frame when driving the pivot frame into the bridge members.

The main plate 502, the barrel drum bridge 560, the wheel train bridge 562, and the anchor escapement bridge are formed from a metal such as brass. Alternatively, the main plate 502, the barrel drum bridge 560, the wheel train bridge 562, the anchor escapement bridge, and the transfer bridge 410 may be formed from a plastic such as polycarbonate. The filler containing resin used for pivot frames in the fourth embodiment of the present invention is the same as the filler containing resin used for the main plate 102 and the wheel train bridge 162 in the first embodiment of the present invention. Therefore, the description regarding the filler containing resin, the base resin, and the carbon filler in the first embodiment of the present invention mentioned above is applied here.

(Other Embodiments)

In the above embodiments of the present invention, the present invention was described for an embodiment of an analog electronic timepiece including a plurality of motors and a plurality of wheel trains, and an embodiment of a mechanical timepiece including one mainspring and one wheel train. However, the present invention may be applied to an analog electronic timepiece including one motor and one wheel train, may be applied to an analog electronic timepiece including one motor and a plurality of wheel trains, may be applied to a mechanical timepiece including a plurality of mainsprings and a plurality of wheel trains, and may be applied to a timepiece including motors and wheel trains, and including mainsprings and wheel trains.

In the above embodiments of the present invention, generally the base resin is polystyrene, polyethylene terephthalate, polycarbonate, polyacetal (polyoxymethylene), polyamide, a modified polyphenylene ether, polybutylene terephthalate, polyphenylene sulfide, polyether ether ketone, or polyether imide.

However, other plastics, for example, a thermoplastic resin such as polysulfone, polyether sulphone, polyethylene, nylon 6, nylon 66, nylon 12, polypropylene, ABS plastic, or AS resin, can also be used as the base resin. Moreover, two or more kinds of the abovementioned thermoplastic resins may be mixed to use as the base resin.

Furthermore, an additive (antioxidant, lubricant, plasticizer, stabilizer, bulking agent, solvent, or the like) may be blended with the base resin used in this invention. Next is a description of an example of experimental data showing that the carbon filler containing resin is superior in sliding performance, smoothness, and surface nature (wear resistance or the like) in the above embodiment, with reference to TABLE 1 and TABLE 2.

TABLE. 1 shows the basic characteristic (coefficient of dynamic friction and specific wear rate) of polyamide resin 12 (PA12) and polycarbonate resin (PC) with a carbon filler of 20% by weight added. That is, in TABLE. 1, VGCF (trademark) "Vapor Grown Carbo Fiber" is a resin with carbon filler of 10% or 20% by weight added. From the experimental data, it can be seen whether or not the surface of the carbon filler-containing resin is a slippery material. The characteristics of non-composite materials to which carbon filler has not been added (resin only, that is PA12 and PC itself) are shown as "Blank" for comparison.

The respective resins above mentioned were injection molded under the molding conditions shown in TABLE 2. That is, for a composite material of PA12 with carbon filler of 20% by weight added, the temperatures was 220° C. at the nozzle, 230° C. at the front section (metering section), 220° C. at the middle section (compressing section), 210° C. at the back section (supplying section), and 70° C. at the mold. For the non-composite material of PA12, the respective temperatures were 190° C., 200° C., 180° C., 170° C., and 70° C. Moreover, for the composite material of PC with carbon filler of 20% by weight added, the above respective temperatures were 290° C., 310° C., 290° C., 270° C., and 80° C., and for the non-composite material of PC, the respective temperatures were 280° C., 290° C., 270° C., 260° C., and 80° C. For the composite material of PA12 with carbon filler of 10% by weight added, the conditions were the same as for with the 20% by weight.

In TABLE. 1, the coefficient of dynamic friction and the specific wear rate ($mm^3$/N·km) denote the values when a resin piece of a predetermined shape (ϕ55 mm×thickness 2 mm) is slid along a copper sheet (S45C) at a speed of 0.5 m/sec while adding the face pressure of 50N. These measuring methods are according to the plastic sliding wear test method (JIS K 7218 standard) (JIS. Japanese Industrial Standard).

As shown in TABLE. 1, both for PA12 and PC, in the basic characteristic (coefficient of dynamic friction and specific wear rate), compared to the non-composite materials with carbon filler not added, the composite materials resin with carbon filler added showed a considerable improvement. Here, the coefficient of dynamic friction is the criteria for determining the smoothness and the surface nature of the surface of the above composite materials. For example, by constituting a gear from a composite material having a lower coefficient of dynamic friction, rotation can be smoothly performed. Moreover, by constituting a gear from a composite material having a lower specific wear rate, wear resistance can be increased.

In the present embodiment, since the components constituting the bearing section or the gears are formed from a carbon filler containing resin, the smoothness of the bearing section or the gears is increased so that it becomes possible to manufacture timepieces and wheel train apparatus having a simple construction without using the ruby jewel, the ruby jewel frame, or the copper alloy pivot frame. Moreover, in the timepiece and the wheel train apparatus of the present embodiment, since the shaft section and the bearing section are formed from a filler containing resin having a base resin filled with a carbon filler, it is not necessary to lubricate the bearing section of the supporting members with lubricating oil, and due to the sliding performance of the carbon filler, the shaft section and the bearing section are unlikely to wear out. Furthermore, in the timepiece and the wheel train apparatus of the present embodiment, since the bearing section and the like are constituted from a filler containing resin, due to the sliding performance of the carbon filler, there is extremely little likelihood of breaking of the components constituting the bearing section when manufacturing.

INDUSTRIAL APPLICABILITY

In the present invention, since the components constituting the bearing section or the gears are formed from a filler containing resin, it becomes possible to manufacture timepieces and wheel train apparatus having the simple construction without using the ruby jewel, the ruby jewel frame, or the copper alloy pivot frame. Moreover, in the timepiece and the wheel train apparatus of the present invention, since the shaft section and the bearing section (or the gears) are formed from a filler containing resin having a base resin filled with carbon filler, it is not necessary to lubricate the bearing section of the supporting members with lubricating oil, and due to the sliding performance of the carbon filler, the shaft section and the bearing section unlikely to wear out. Regarding the bearing section of the wheel train apparatus of the present invention, there is extremely little likelihood of breaking of the components constituting the bearing section when manufacturing. Furthermore, in the timepiece having the wheel train and the wheel train apparatus of the present invention, since the components constituting the shaft section and the bearing section (or the gears) are formed from a general purpose resin with a base resin, the cost becomes low and the resin can be recycled better.

TABLE 1

| Item | Units | PA12 | | PC | |
|---|---|---|---|---|---|
| | | VGCF 20 wt % | BLANK | VGCF 20 wt % | BLANK |
| Dynamic friction coefficient | | 0.25 | 0.56 | 0.18 | 0.51 |
| Specific wear rate | $mm^3/N \cdot km$ | $3.8 \times 10^{-13}$ | $5.2 \times 10^{-11}$ | $3.3 \times 10^{-8}$ | $8.1 \times 10^{-8}$ |

TABLE 2

| | PA 12 | | PC | |
|---|---|---|---|---|
| | VGCF | BLANK | VGCF | BLANK |
| NOZZLE | 220° C. | 190° C. | 290° C. | 280° C. |
| FRONT SECTION | 230° C. | 200° C. | 310° C. | 290° C. |
| MIDDLE SECTION | 220° C. | 180° C. | 290° C. | 270° C. |
| BACK SECTION | 210° C. | 170° C. | 270° C. | 260° C. |
| MOLD TEMP. | 70° C. | 70° C. | 80° C. | 80° C. |

The invention claimed is:

1. A timepiece having a driving source and a wheel train comprising:

a motor and/or a spiral spring constituting said driving source;

a gear wheel configured so as to rotate by rotation of said motor, and/or a gear wheel configured so as to rotate using said spiral spring as said driving source, said gear wheel having a gear wheel section and a shaft section; and supporting members including a bearing section which rotatably supports said shaft section of said gear wheel, wherein said supporting members is formed from a filler containing resin having a base resin of thermoplastic resin and carbon filler mixed with this base resin, said carbon filler is selected from a group consisting of; a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doped with boron, so that the construction is such that said bearing section of said supporting members does not require lubricating oil.

2. A timepiece having a driving source and a wheel train comprising:

a motor and/or a spiral spring constituting said driving source;

a gear wheel configured so as to rotate by rotation of said motor, and/or a gear wheel configured so as to rotate using said spiral spring as said driving source, said gear wheel having a gear wheel section and a shaft section; and supporting members including a bearing section which rotatably supports said shaft section of said gear wheel, wherein said supporting members is formed from a filler containing resin having a base resin of thermoplastic resin and carbon filler mixed with this base resin, said carbon filler is a vapor growth carbon fiber with a diameter of 50 nm to 200 nm, and an aspect ratio of 10 to 1000, so that the construction is such that said bearing section of said supporting members does not require lubricating oil.

3. A timepiece having a driving source and a wheel train comprising:

a motor and/or a spiral spring constituting said driving source;

a gear wheel configured so as to rotate by rotation of said motor, and/or a gear wheel configured so as to rotate using said spiral spring as said driving source, said gear wheel having a gear wheel section and a shaft section; and supporting members including a bearing section which rotatably supports said shaft section of said gear wheel, wherein said supporting members is formed from a filler containing resin having a base resin of thermoplastic resin and carbon filler mixed with this base resin, at least said shaft section of said gear wheel is formed from a filler containing resin having a base resin of thermoplastic resin and carbon filler mixed with this base resin, said carbon filler is selected from a group consisting of; a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doped with boron, so that the construction is such that said bearing section of said supporting members does not require lubricating oil.

4. A timepiece having a driving source and a wheel train comprising:

a motor and/or a spiral spring constituting said driving source;

a gear wheel configured so as to rotate by rotation of said motor, and/or a gear wheel configured so as to rotate using said spiral spring as said driving source, said gear wheel having a gear wheel section and a shaft section; and supporting members including a bearing section which rotatably supports said shaft section of said gear wheel, wherein said supporting members is formed from a filler containing resin having a base resin of thermoplastic resin and carbon filler mixed with this base resin, at least said shaft section of said gear wheel is formed from a filler containing resin having a base resin of thermoplastic resin and carbon filler mixed with this base resin, said carbon filler is a vapor growth carbon fiber with a diameter of 50 nm to 200 nm, and an aspect ratio of 10 to 1000, so that the construction is such that said bearing section of said supporting members does not require lubricating oil.

5. A timepiece having a driving source and a wheel train comprising:

a motor and/or a spiral spring constituting said driving source;

a gear wheel configured so as to rotate by rotation of said motor, and/or a gear wheel configured so as to rotate using said spiral spring as said driving source, said gear wheel having a gear wheel section and a shaft section; and supporting members including a bearing section which rotatably supports said shaft section of said gear wheel, wherein said gear wheel is formed from a filler containing resin having a base resin of thermoplastic resin and carbon filler mixed with this base resin, said carbon filler is selected from a group consisting of; a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doped with boron, so that the construction is such that said bearing section of said supporting members does not require lubricating oil.

6. A timepiece having a driving source and a wheel train comprising:

a motor and/or a spiral spring constituting said driving source, a gear wheel configured so as to rotate by rotation of said motor, and/or a gear wheel configured so as to rotate using said spiral spring as said driving source, said gear wheel having a gear wheel section and a shaft section; and supporting members including a bearing section which rotatably supports said shaft section of said gear wheel, wherein said gear wheel is formed from a filler containing resin having a base resin of thermoplastic resin and carbon filler mixed with this base resin, said carbon filler is a vapor growth carbon fiber with a diameter of 50 nm to 200 nm, and an aspect ratio of 10 to 1000, so that the construction is such that said bearing section of said supporting members does not require lubricating oil.

7. A wheel train apparatus-including a gear wheel and supporting members comprising:

a gear wheel having a gear wheel section and a shaft section; and supporting members including a bearing which rotatably supports said shaft section of said gear wheel, wherein said supporting members is formed from a filler containing resin having a base resin of thermoplastic resin and carbon filler mixed with this base resin, said carbon filler is selected from a group consisting of; a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doped with boron, so that the construction is such that said bearing section of said supporting members does not require lubricating oil.

8. A wheel train apparatus including a gear wheel and supporting members comprising:

a gear wheel having a gear wheel section and a shaft section; and supporting members including a bearing which rotatably supports said shaft section of said gear wheel, wherein said supporting members is formed from a filler containing resin having a base resin of thermoplastic resin and carbon filler mixed with this base resin, said carbon filler is a vapor growth carbon fiber with a diameter of 50 nm to 200 nm, and an aspect ratio of 10 to 1000, so that the construction is such that said bearing section of said supporting members does not require lubricating oil.

9. A wheel train apparatus including a gear wheel and supporting members comprising:

a gear wheel having a gear wheel section and a shaft section; and supporting members including a bearing which rotatably supports said shaft section of said gear wheel, wherein said supporting members is formed from a filler containing resin having a base resin of thermoplastic resin and carbon filler mixed with this base resin, at least said shaft section of said gear wheel is formed from a filler containing resin having a base resin of thermoplastic resin and carbon filler mixed with this base resin, said carbon filler is selected from a group consisting of; a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doped with boron, so that the construction is such that said bearing section of said supporting members does not require lubricating oil.

10. A wheel train apparatus including a gear wheel and supporting members comprising:

a gear wheel having a gear wheel section and a shaft section; and supporting members including a bearing which rotatably supports said shaft section of said gear wheel, wherein said supporting members is formed from a filler containing resin having a base resin of thermoplastic resin and carbon filler mixed with this base resin, at least said shaft section of said gear wheel is formed from a filler containing resin having a base resin of thermoplastic resin and carbon filler mixed with this base resin, said carbon filler is a vapor growth carbon fiber with a diameter of 50 nm to 200 nm, and an aspect ratio of 10 to 1000, so that the construction is such that said bearing section of said supporting members does not require lubricating oil.

11. A wheel train apparatus including a gear wheel and supporting members comprising:

a gear wheel having a gear wheel section and a shaft section; and supporting members including a bearing which rotatably supports said shaft section of said gear wheel, wherein said gear wheel is formed from a filler containing resin having a base resin of thermoplastic resin and carbon filler mixed with this base resin, said carbon filler is selected from a group consisting of; a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doped with boron, so that the construction is such that said bearing section of said supporting members does not require lubricating oil.

12. A wheel train apparatus including a gear wheel and supporting members comprising:

a gear wheel having a gear wheel section and a shaft section; and supporting members including a bearing which rotatably supports said shaft section of said gear wheel, wherein said gear wheel is formed from a filler containing resin having a base resin of thermoplastic resin and carbon filler mixed with this base resin, said carbon filler is a vapor growth carbon fiber with a diameter of 50 nm to 200 nm, and an aspect ratio of 10 to 1000, so that the construction is such that said bearing section of said supporting members does not require lubricating oil.

* * * * *

UNITED STATES PATENT AND TRADEMARK OFFICE
CERTIFICATE OF CORRECTION

PATENT NO. : 7,170,827 B2
APPLICATION NO. : 10/499688
DATED : January 30, 2007
INVENTOR(S) : Endo et al.

It is certified that error appears in the above-identified patent and that said Letters Patent is hereby corrected as shown below:

On the title page, item (54), in “Title”, in column 1, lines 1-2, delete “TIMEPIECE, HAVING BEARING PORTION FORMED OF RESIN AND WHEEL TRAIN” and insert -- TIMEPIECE HAVING RESIN BEARING AND WHEEL TRAIN APPARATUS --, therefor.

On the title page, item (74), in “Attorney, Agent or Firm”, in column 2, line 2, after “Pfleger” delete “,”.

In column 1, lines 1-2, delete “TIMEPIECE, HAVING BEARING PORTION FORMED OF RESIN AND WHEEL TRAIN” and insert -- TIMEPIECE HAVING RESIN BEARING AND WHEEL TRAIN APPARATUS --, therefor.

In column 20, line 18, in Claim 6, after “source” delete “,” and insert -- ; --, therefor.

In column 20, line 35, in Claim 7, delete “apparatus-including” and insert -- apparatus including --, therefor.

Signed and Sealed this

Twenty-seventh Day of May, 2008

JON W. DUDAS
*Director of the United States Patent and Trademark Office*